(12) United States Patent
Evans et al.

(10) Patent No.: US 7,404,644 B2
(45) Date of Patent: Jul. 29, 2008

(54) TIME-SEQUENTIAL COLOUR PROJECTION

(75) Inventors: Allan Evans, Oxford (GB); Grant Bourhill, Stow-on-the-World (GB); Marina V. Khazova, Oxfordshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 358 days.

(21) Appl. No.: 11/127,710

(22) Filed: May 12, 2005

(65) Prior Publication Data
US 2005/0254127 A1   Nov. 17, 2005

(30) Foreign Application Priority Data
May 12, 2004   (GB)   ................................. 0410568.0

(51) Int. Cl.
  *G03B 21/00* (2006.01)
  *G03B 21/26* (2006.01)
  *G03B 21/20* (2006.01)
  *G02F 1/1335* (2006.01)
  *H04N 9/12* (2006.01)

(52) U.S. Cl. ........................... 353/31; 353/94; 353/102; 349/5; 349/7; 349/8; 348/742

(58) Field of Classification Search .................... 353/20, 353/31, 33, 94, 99; 348/742, 771; 349/5–8; 362/19, 230; 359/850, 872, 497
See application file for complete search history.

(56) References Cited

U.S. PATENT DOCUMENTS 5,428,366 A   6/1995   Eichenlaub 7,159,987 B2 *   1/2007   Sakata ......................... 353/31
7,165,845 B2 *   1/2007   Takeda et al. ................. 353/31
2003/0214633 A1 *   11/2003   Roddy et al. .................. 353/31

FOREIGN PATENT DOCUMENTS

| CN | 1166881 | 12/1997 |
| CN | 1451240 | 10/2003 |
| JP | 08-076078 | 3/1996 |
| WO | 97/13175 | 4/1997 |
| WO | 02/19725 A1 | 3/2002 |

OTHER PUBLICATIONS

Chinese Office Action for corresponding Application No. 200510083786.9 dated Feb. 16, 2007(English translation).

* cited by examiner

*Primary Examiner*—Melissa Jan Koval
(74) *Attorney, Agent, or Firm*—Renner, Otto, Boisselle & Sklar, LLP

(57) ABSTRACT

A time-sequential colour projector comprises a pixellated light valve (2), such as a liquid crystal device, and a plurality of light sources (30, 31, 32). The light sources (30, 31, 32) direct light on different sets of pixels of the light valve (2) via an optical system (1), such as a lens array, which focuses the light on pixels of the light valve (2). At least two of the light sources (30, 31, 32) are multiple colour light sources and the multiple colour light sources emit different colour components during each set of frames making up a complete image frame.

31 Claims, 21 Drawing Sheets

Time frame 1

| R | R | R |
|---|---|---|
| G | G | G |
| B | B | B |
| R | R | R |
| G | G | G |
| B | B | B |

Time frame 2

| G | G | G |
|---|---|---|
| R | R | R |
| B | B | B |
| G | G | G |
| R | R | R |
| B | B | B |

(b)

| R | G | B | R | G | B |
|---|---|---|---|---|---|
| G | B | R | G | B | R | G |
| R | G | B | R | G | B |

Time frame 1

| G | R | B | G | R | B |
|---|---|---|---|---|---|
| R | B | G | R | B | G | R |
| G | R | B | G | R | B |

Time frame 2

(c)

| R | G | B | R | G | B |
|---|---|---|---|---|---|
| B | R | G | B | R | G |
| G | B | R | G | B | R |

Time frame 1

| G | R | B | G | R | B |
|---|---|---|---|---|---|
| B | G | R | B | G | R |
| R | B | G | R | B | G |

Time frame 2

(a)

(b)

TIME-SEQUENTIAL COLOUR PROJECTION

BACKGROUND OF THE INVENTION

1. Field of the Invention

The present invention relates to a time-sequential colour projector. Applications of such projectors include video and data projectors used to project images from electronic data sources. Such projectors include front and rear projectors, projectors for cinema and home entertainment, projectors for head-up displays in vehicles, projectors for business and conference applications and miniature portable projectors.

2. Description of the Related Art

Electronic projectors typically make use of one or more 'light valves', which are typically planar devices divided into pixels. The fraction of incident light which each pixel transmits or reflects can be controlled independently. A projector also contains an optical system for illuminating such a light valve, electronics for controlling the valve, and an optical system for projecting an image displayed by the light valve on a screen.

Three types of light valves are currently used in known projectors, namely transmissive liquid crystal panels, reflective liquid crystal panels, and micromirror devices. Each of these devices is monochrome: the fraction of light each pixel reflects or transmits is controlled but the colour is not.

A colour projector can be constructed using monochrome light valves in a number of ways. Most commercially available projectors use either the three-panel system or the time-sequential colour system.

In a three-panel projector, red light is sent through one panel, green light through another, and blue light through a third panel. Images of the three panels are superimposed using combining optics such as a dichroic prism.

In a time-sequential colour projector, a single light valve is used. An image is displayed and the valve is illuminated first with red light; then the image displayed is changed, and the valve is illuminated with green light; then the image is changed again and the valve is illuminated with blue light. This sequence is repeated rapidly enough for the viewer's eye to fuse the three single-colour projected images into a single, colour image.

The time-sequential colour system has the following disadvantages. Flicker or colour artefacts may be visible. A fast light valve (such as a micromirror device) is necessary and these are typically more expensive than relatively slow light valves such as transmissive liquid crystal panels. If a white light source is used, then at any time, less than one-third of the light output can be used. For example, when the red image is displayed, green and blue light from the light source must be discarded. This means that the optical efficiency of the projector is low.

The three-panel system has the disadvantage that three panels and colour separating and combining optics are required, increasing the cost of the system. Also, the images from the three panels must be made to converge with high precision, thus complicating the manufacturing process.

These projector architectures are well known and are disclosed in detail by Stupp and Brennesholtz in the book *Projection displays* (Wiley 1999).

A known system which overcomes some of the shortcomings of the three-panel and time-sequential designs is disclosed in U.S. Pat. No. 5,161,042. A lamp emits white light. The red, green and blue components are reflected to slightly different angles by three colour-selective (dichroic) mirrors. The light valve is a transmissive panel. An array of microlenses is placed close to the panel, on the side facing the light source, so that the pixels of the panel are in the focal plane of the microlenses.

The lenses are arranged so that, because of the different directions of travel of the red, green and blue beams, the different colours are sent to different pixels in the display panel. This is illustrated in FIG. 1 of the accompanying drawings. As seen by the projection lens, the panel therefore resembles a microfilter colour display panel as used in direct-view displays. However, the losses caused by absorption in the filters in such displays are avoided.

A related system is disclosed in EP1089115. Here angular colour separation is used with a reflective panel and the structure of the reflective pixels is modified to reflect light in the correct direction for the projection system.

These systems share some of the advantages of both the time-sequential and the three-panel architectures. No light is lost in colour filters and only one panel is used. A disadvantage is that the spatial resolution of the system is reduced by a factor of three.

Another disadvantage is that, in order to achieve a high throughput of light, the microlens arrays must have a low f-number. Each lens has a diameter equal to three colour sub-pixel widths so that, as the light valve panel size becomes smaller, the required separation between lenses and the panel pixels also becomes small. Because typical liquid crystal light valves are manufactured on a glass substrate with thickness of order 0.5 mm, there is a lower limit to the separation which can easily be achieved. For smaller separations, lenses must be integrated into the panel itself. This is possible in principle, but means that light valves must be specially manufactured for this purpose, thus increasing the cost and complexity.

Systems with angular colour separation, as described above, suffer from the problem that the resolution is reduced by a factor of three compared to the base panel.

This problem can be removed by switching the colours between the different directions rapidly. For example, in time frame 1, red light might follow the path shown by dotted lines in FIG. 1, green light the path shown by solid lines, and blue light the path shown by dashed lines. In time frame 2, red light would be represented by solid lines, green by dashed lines, and blue by dotted lines. In time frame 3, red light would be represented by dashed lines, green light by dotted lines and blue light be solid lines. The image displayed by the light valve is changed for each time frame so that a colour image is built up over the three frames.

As in a time-sequential colour projector, if the projector switches rapidly enough between these three states, the eye fuses the red, green and blue light from each pixel into a single, colour image. This type of projector design is known as 'angular time-sequential colour' (ATSC). The problem of reduced resolution for angular colour separation is thus removed but the problem of panel-barrier separation remains.

In all known ATSC projectors, a white light source is used and there is a mechanism which separates the white light into three colour beams travelling at different angles and which is able to switch rapidly the colours between the different directions. U.S. Pat. No. 5,969,832 discloses two different mechanisms for this purpose. In the first mechanism, a holographic optical element (HOE) causes light of different colours to travel in different directions. There are three different HOEs, each HOE giving a different mapping of colours to directions. Switching is achieved by sequentially moving the three HOEs into the active position on a moving belt. In the second mechanism, the three colours are separated by dichroic mirrors. After being reflected by these mirrors, the light is reflected by another mirror before reaching a microlens array adjacent to the light valve. Tilting this second mirror changes the angles of the red, green and blue rays and switches the colours of the pixels. A similar system is also disclosed where the lens array shifts relative to the panel to switch the colours of the pixels.

Japanese patent application number 2001223178 discloses another mechanism which depends upon switchable holographic optical elements to switch colours between angles.

U.S. Pat. No. 6,547,398 discloses two designs. In both, colours are separated by dichroic mirrors and a microlens array focuses the different colours to spots in its focal plane. A difference between these designs and others is that the microlens array is not close to the light valve. Instead, the system of colour spots is re-imaged by a double lens system onto the panel. In the first design, the microlens array shifts in its own plane to switch the colours of the pixels; in the second design, a mirror tilts as in the second mechanism of U.S. Pat. No. 5,969,832.

Re-imaging of the colour spots as disclosed in U.S. Pat. No. 6,547,398 is a solution to the problem of lens-panel separation suffered by both angular colour projectors and ATSC projectors. However, it has the disadvantage that because macroscopic lenses are used, aberrations may make it difficult to align the system. Also, because a lens at least the size of the panel is required, the microlens array must be separated from the panel by at least two panel diameters: this increases the size of the system.

All the projector designs mentioned hereinbefore (and in fact all commercially available electronic projectors) use white light sources such as high-pressure discharge lamps. However, recent advances in the technology have made LED illumination possible for low-power projectors.

The advantages of using LEDs as light sources in projectors are their small size, long lifetime, robustness and low temperature and pressure of operation. They can also be more efficient as single-colour light sources than conventional types of lamp. The possible replacement of conventional lamps by LEDs in various applications is reviewed in an article by Bergh et al, 'The promise and challenge of solid-state lighting', *Physics Today* December 2001 pp 42-47.

The known designs of LED projectors fall into three classes: projectors using microfilter panels; projectors using time-sequential colour; and three-panel projectors.

An article by Keuper et al, 'Ultra-compact LED based image projector for portable applications', *SID* 2003 *Digest* paper P-126 discloses three designs for LED projectors. Two of these use white LEDs with microfilter panels. Microfilter panels are the type of panel used in direct-view displays, where pixels are arranged in groups of three and each group has one pixel with a red filter, one with a green filter, and one with a blue filter.

The main advantage of this type of projector is low cost. Microfilter panels are available very cheaply because they are used in portable telephones and other portable electronic devices. Also the projector design is very simple. This type of LED projector has the disadvantage that at least two-thirds of the light is absorbed by the filters. It is therefore inefficient in its use of light. The resolution is also coarser than that of the base panel by a factor of three.

Electronic light sources such as LEDs are particularly suitable for time-sequential colour projectors for two reasons. They are efficient as sources of light of a single colour and they can be switched on and off very rapidly. By using LEDs, it is therefore possible to avoid the use of filters, which absorb two-thirds of the light in time-sequential colour projectors with white-light sources. Red LEDs are illuminated while the red image is displayed on the light valve, and similarly for the other colours.

The article by Keuper et al also discloses a time-sequential colour LED projector. Other such designs are disclosed in WO02080136, U.S. 20030133080, EP0888016, and EA01347653. This type of projector has the advantages that it is efficient in its use of light, that it uses only a single panel, and that the resolution of the base panel is maintained. Its disadvantages are the presence of flicker and colour defects if the frame rate is not high enough and the fact that the panel must run at at least three times video speed, which makes it expensive.

A third type of LED projector design is to illuminate one panel with red LEDs, one with blue, and one with green. The images from the three panels are then combined in the same way as in a conventional three-panel projector. Projectors of this type are disclosed in U.S. Pat. No. 6,224,216 and U.S. Pat. No. 6,281,949. This type of projector has the advantages that it is efficient in the use of light and that it maintains the resolution of the base panel. However, the use of three panels adds to the cost and bulk of the projector.

A different LED projector design is disclosed in Japanese application 2001371785. An array of LEDs generates a small block image and a vertical and horizontal scanner rapidly diverts the image of this block as the pattern of LED illumination is changed. A larger image is thus built up over time. This design has high light efficiency but has the disadvantage of requiring high-speed mechanical scanning apparatus, which is expensive and unreliable.

EP01024669 discloses a design for an LED illumination system for projectors which includes a reflecting surface for collimation and means for converting a large fraction of the light emitted to a single polarisation state.

V. Medvedev et al: 'Uniform LED illuminator for miniature displays' *SPIE Proceedings* vol. 3428, pp 142-153 (1998) discloses a similar reflective illuminator. G. Harbers et al: *SID Microdisplay* 2002, *Digest of papers* pp 22-25 (2002) also discloses how high-power LEDs can be used in electronic projectors.

It is well known that the human visual system makes little use of blue in perception of the fine details of a scene, for example as disclosed in J. S Wolffsohn et al, 'Contrast is enhanced by yellow lenses because of selective reduction of short-wavelength light', *Optometry and vision science* vol 77, pp 73-81 (2000), and J. K Hovis et al, 'Physical characteristics and perceptual effects of blue-blocking lenses', *Optometry and vision science* vol 66, pp 682-689 (1989).

In three-panel projectors, it is possible to take advantage of this fact by using a lower-resolution panel for the blue channel than for the red and green channels, as disclosed in R. Martin et al: 'Detectability of reduced blue pixel count in projection displays', *Proceedings of the Society for Information Display*, vol 24, pp 606-609 (1993).

This lack of sensitivity to high-frequency blue information can also be used in direct-view displays, where the arrangement of colour filters can be changed to match the characteristics of the display to those of the human visual system. This is disclosed in; WO02091348, U.S. 2002015110, U.S. application 20030128179, U.S. application 20030090581, C. H. Brown-Elliot, 'Reducing pixel count without reducing image quality', *Information Display* vol. 99(12) (1999), and T. L. Credelle et al: 'MTF of high-resolution Pentile matrix displays', Eurodisplay 2002 Digest, pp 159-162).

It is possible to enhance the light throughput in some types of electronic projectors and direct-view displays by integrating microlens structures into the pixels of the light valve. U.S.

Pat. No. 5,682,215 discloses such a technique, and gives two methods of placing lenses into the structure of a transmissive liquid crystal display panel. These methods are: ion implantation to change the local refractive index profile of the glass substrate; and etching relief structures into the substrate which are then filled with a polymer resin of a different refractive index. U.S. Pat. No. 5,844,644 discloses an alternative scheme where the lenses are incorporated in an 'overcoat' layer placed over the colour filters.

SUMMARY OF THE INVENTION

An embodiment of one aspect of the present invention provides a time-sequential colour projector comprising a first pixellated light valve and first and second light sources. An optical system is arranged to direct light from the light sources on first and second sets of pixels, respectively, of the first light valve. The first light source is arranged to emit first and second colours in first and second sequences of time frames, respectively. The second light source is arranged to emit a third colour different from the first colour and fourth colour different from the second colour in the first and second time frame sequences, respectively.

Each of the first and second light sources may comprise a multiple colour light emitter.

Each of the first and second light sources may comprise first light emitters for emitting light of the first or third colour and second light emitters for emitting light of the second or fourth colour.

The first and second light sources may be arranged to direct light in first and second angular ranges, respectively, towards the first light valve.

The first and second light sources may comprise a two-dimensional array of light emitters. The light emitters may be arranged as rows cooperating with a cylindrically converging lens array to direct light onto the pixels of the light valve.

The first colour may be the same as the fourth colour and the second colour may be the same as the third colour. The first and fourth colours may be red and the second and third colours may be green.

The projector may comprise a third light source arranged to emit a fifth colour, different to the first to fourth colours, and to direct this towards the first light valve. The fifth colour may be blue. The third light source may comprise a two-dimensional array of light emitters arranged in a different plane to the two-dimensional light emitter array of the first and second light sources mentioned above.

Or, the projector may comprise a second pixellated light valve, a third light source for directing blue light towards the second light valve, and an optical combiner for combining light from the first and second light valves into a common projection light path.

The projector may comprise a third light source arranged to direct light on a third set of pixels of the first light valve, each of the light sources being arranged to emit first, second and third colours in a repeating sequence such that the light sources emit different colours in time frames of a repeating set of three time frames. The first, second and third colours may be red, green and blue, respectively. The third light source may be arranged to direct light in a third angular range towards the first light valve.

The optical system may comprise a first microlens array. The first microlens may array comprise a hexagonal array of spherically converging lenses. Or, the first microlens array may comprise an array of cylindrically converging lenses. The optical system may comprise a second microlens array optically in series with the first array. As an alternative, the optical system may comprise a field lens optically in series with the first array.

Each light source may be an electronic light source.

Each light source may be arranged to emit a single colour in each time frame sequence. At least one light source may comprise a broadband emitter cooperating with a switchable filter.

At least one light source may be electronically switchable.

At least one light source may comprise at least one electronic light emitter. At least one light emitter may comprise a neon lamp. At least one light emitter may comprise a solid state light emitter. At least one light emitter may comprise a semiconductor light emitter. At least one light emitter may comprise one of a light emitting diode, a resonant-cavity light emitting diode, a superluminescent diode and a laser diode. At least one light emitter may be adapted to emit light in a narrow emission band.

At least one light source may comprise a collimator and first and second lens arrays, each of the lenses of the first lens array having substantially the same aspect ratio as the first light valve and focussing light at the second lens array, each lens of the second lens array forming an image of a respective lens of the first lens array which substantially covers the first light valve.

The or each light valve may comprise a liquid crystal device.

It is thus possible to provide a time-sequential colour projector which has all of the advantage of known projectors of this type. For example, the projected images have the full spatial resolution of the light valve or valves and no light is absorbed by colour filters so that the light-efficiency is relatively high. Also, the visibility of flicker and colour artefacts is reduced compared with known time-sequential colour designs because the whole image frame does not change colour at the same time. In addition, the use of electronic light sources provides high efficiency of illumination, relatively long light source lifetime, robustness, and reduced cost.

BRIEF DESCRIPTION OF THE DRAWINGS

FIG. 3 illustrates diagrammatically three examples of pixel colour sequences in a two-frame ATSC or time sequential colour projector;

DETAILED DESCRIPTION OF THE PREFERRED EMBODIMENTS

Figure 1:
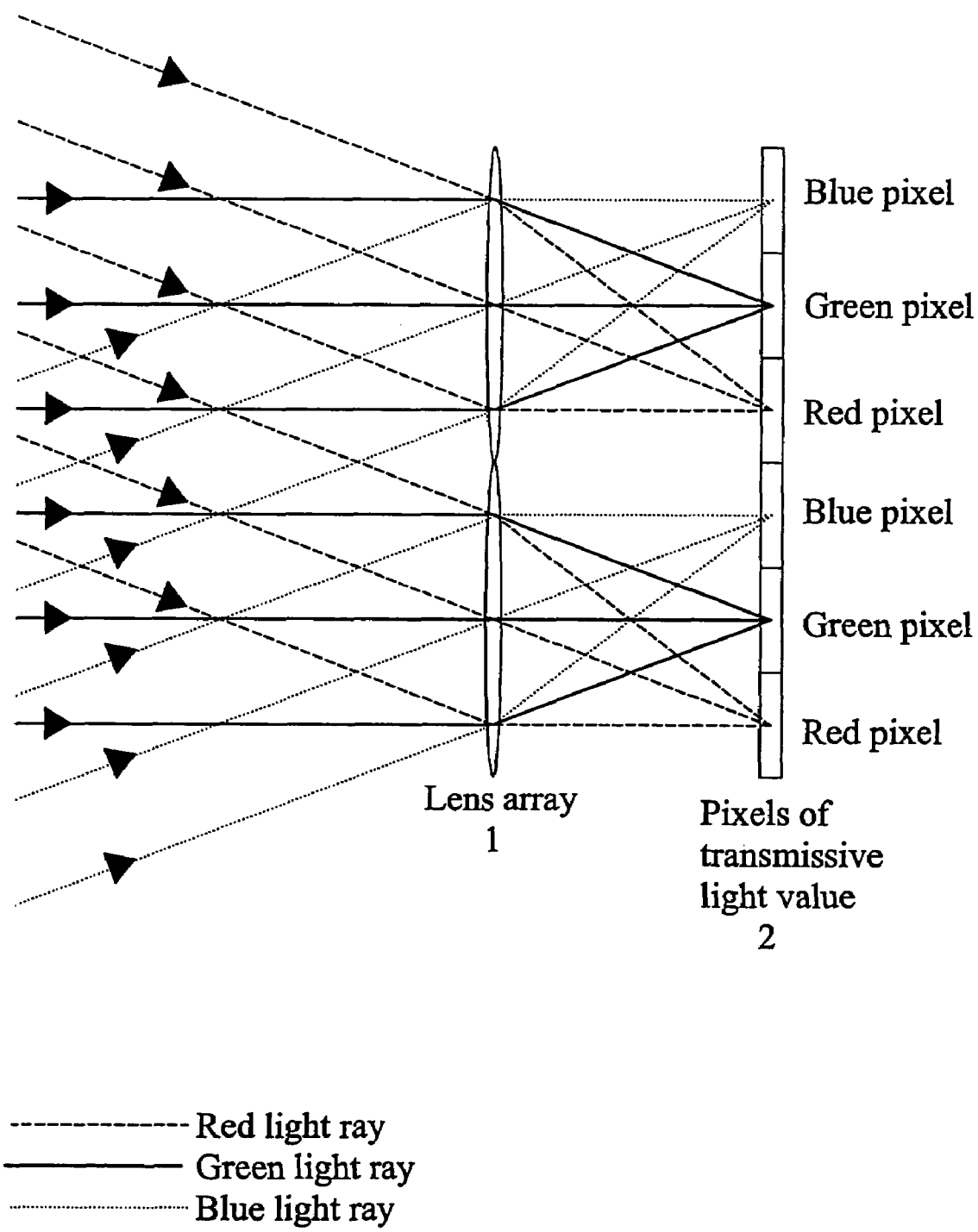
FIG. 1 illustrates diagrammatically a known arrangement of light valve pixels and a lens array in an angular colour projector.

Like reference numerals refer to like parts throughout the drawings.

As described hereinbefore, FIG. 1 illustrates part of the light path in a known type of angular colour projector. The red light path is illustrated by the broken lines, the green light path by the solid lines and the blue light path by the dotted lines. Red, green and blue light rays are incident on a lens array 1 at different angles or in different angular ranges. The lens array 1 is disposed in front of the pixels of a transmissive light valve 2, such as a liquid crystal device. The pitch of the lens array 1 is substantially equal to three times the pitch of the light valve pixels 2 with each lens of the array 1 being aligned with three pixels or three rows of pixels of the light valve. Light incident on the lens array 1 is substantially collimated and the pixels of the light valve are disposed substantially in the focal plane of the lens array 1. Thus, the red, green and blue light rays are focused onto respective pixels or rows of pixels.

As also described hereinbefore, this type of projector system may also be used in angular time-sequential colour (ATSC) projectors by cyclically changing the colours directed along each of the light paths. For example, each composite full colour image is displayed in a respective set of three consecutive time frames. In the first time frame, the individual colour light paths are as shown in FIG. 1. In a second time frame, red light follows the light path shown in solid lines, green light follows the light path shown in dotted lines and blue light follows the light path shown in broken lines. In a third time frame, red light follows the light path shown in dotted lines, green light follows the light path shown in broken lines and blue light follows the light path shown in solid lines. The sequence is repeated for each image frame, for example to allow a full-colour full-motion video sequence to be projected onto a screen for viewing.

Figure 2:
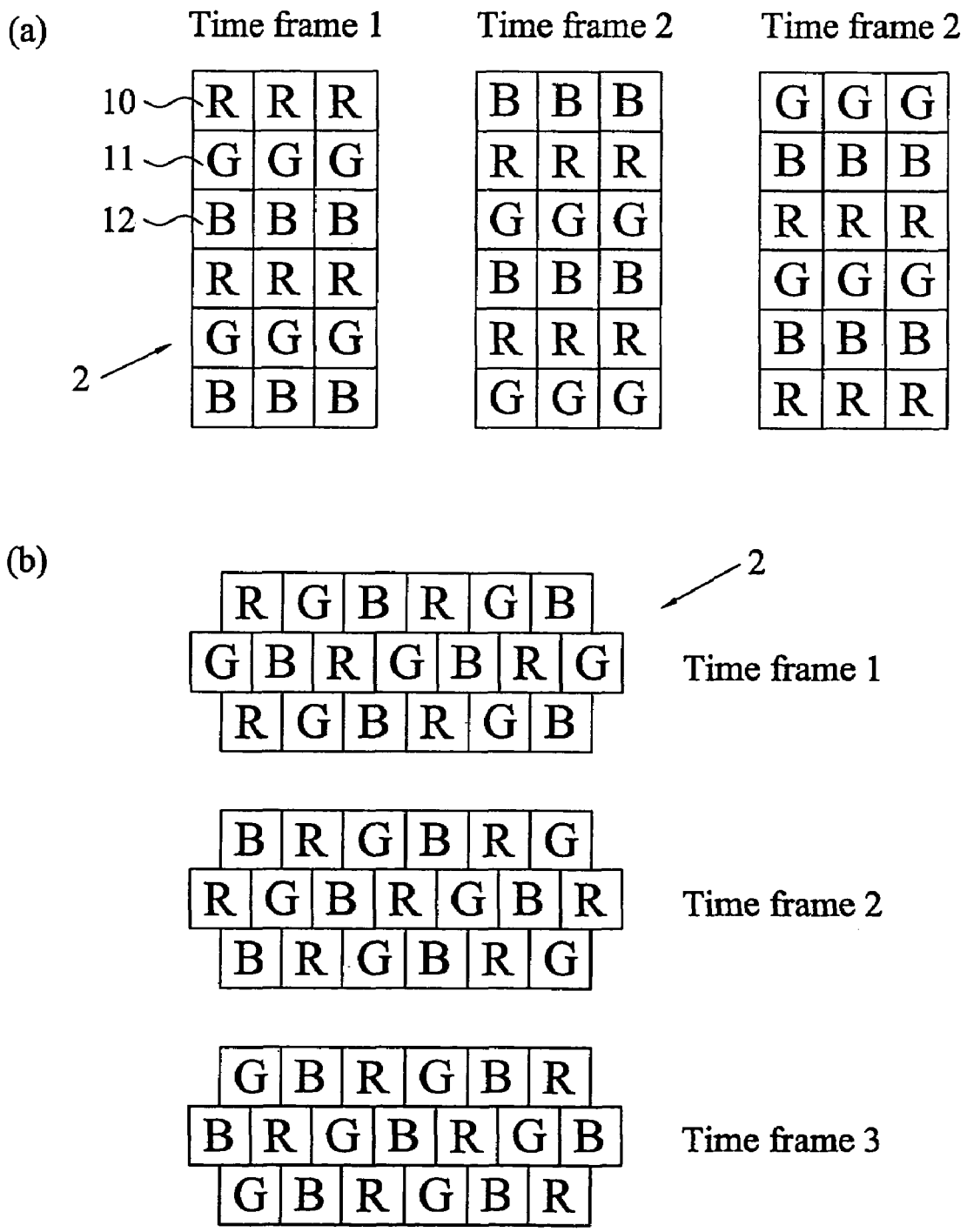
FIG. 2 illustrates diagrammatically two examples of pixel colour sequences in a three-frame angular time sequential colour (ATSC) or time sequential colour projector.

FIG. 2 illustrates two examples of pixel colour sequences which may be provided by an arrangement of this type. In the first sequence shown at (a), during each of the three time frames illustrated, the individual colour pixels are arranged as rows in a pattern which repeats vertically for each three rows. The light sources (described hereinafter) and the lens array 1 or other optical system are arranged such that red light is directed to the pixels such as 10 in the top row of the light valve 2, green light is directed to the pixels such as 11 in the second row, and blue light is directed to the pixels such as 12 in the third row. In the second time frame, blue light is directed to the pixels in the top row, red light is directed to pixels in the second row and green light is directed to pixels in the third row. In the third time frame, green light is directed to pixels in the top row, blue light to pixels in the second row and red light to pixels in the third row.

The second sequence is illustrated at (b) in FIG. 2 for a light valve 2 in which alternate rows are horizontally offset. As in the first sequence, the colour supplied to each pixel is indicated by R for red, G for green and B for blue.

As described hereinafter, because the human visual system is much less sensitive to spatial detail at blue wavelengths of light, an alternative sequence of pixel colours may be used in which the red and green light directions are switched in consecutive time frames but the blue direction remains fixed. Thus, blue light is always incident on the same set of pixels of the light valve.

FIG. 3 illustrates three examples of sequences of pixel colouring which may be used to provide such an arrangement. The first sequence shown at (a) resembles the sequence shown at (a) in FIG. 2 in that, during each time frame, each row of pixels receives light of a single colour. Thus, in the first time frame, the first row receives red light and the second row receives green light whereas, in the second time frame, the first row receives green light and the second row receives red light. During both time frames, the third row receives blue light so that the position or angle of the blue light source does not change. This sequence is repeated for each pair of time frames.

Two further possible sequences are illustrated at (b) and (c) in FIG. 3 and will not be described further.

The image spatial resolution of this type of sequence is reduced compared with that of the sequences illustrated in FIG. 2. In particular, the red and green components of each image have approximately two thirds of the spatial resolution of the light valve whereas the blue images component has approximately one third of the resolution. However, in many applications, this may be acceptable as it reflects the characteristic of the human visual system, which is sensitive to detail in the green and red bands at approximately twice the spatial resolution in the blue band.

An advantage of sequences of this type is that the light valve need only operate at twice the "normal" video rate (for non-time-sequential techniques) whereas the light valve would run at three times the normal rate for sequences of the type illustrated in FIG. 2. Thus, a less expensive light valve may be used. Also, the illumination system is simpler since only two dual-colour light sources are required instead of three triple-colour sources.

In general, an optical system is required in order to direct light from the different light sources to the appropriate pixels of the light valve. In the arrangement shown in FIG. 1, the single lens array 1 performs this function. The lens array 1 may be manufactured separately from the light valve 2 or may be an integral part of the light valve. If a separate lens array is used, it is possible to use an existing or commercially available light valve, which does not therefore need to be specially manufactured for the purpose. However, because liquid crystal light valves have a transparent substrate, for example made of glass or quartz, and the substrate has a thickness of the order 0.5 mm, the presence of the substrate determines a minimum separation between the plane of the lenses of the array 1 and the plane of the pixels of the light valve 2.

An advantage of using an integral lens array is that alignment of the lenses with the pixels may be performed using the same techniques as are used to align other parts of the light valve; this allows accurate alignment to be achieved simply and at low cost. Also, the lenses may be disposed nearer the pixels. Because the f-number of the lenses determines the range of angles from which light can be accepted and focused onto a pixel, a smaller spacing allows a smaller f-number and hence a wider acceptance angle. This leads to a larger system etendue, thus improving efficiency of light usage in the projector.

Figure 4:
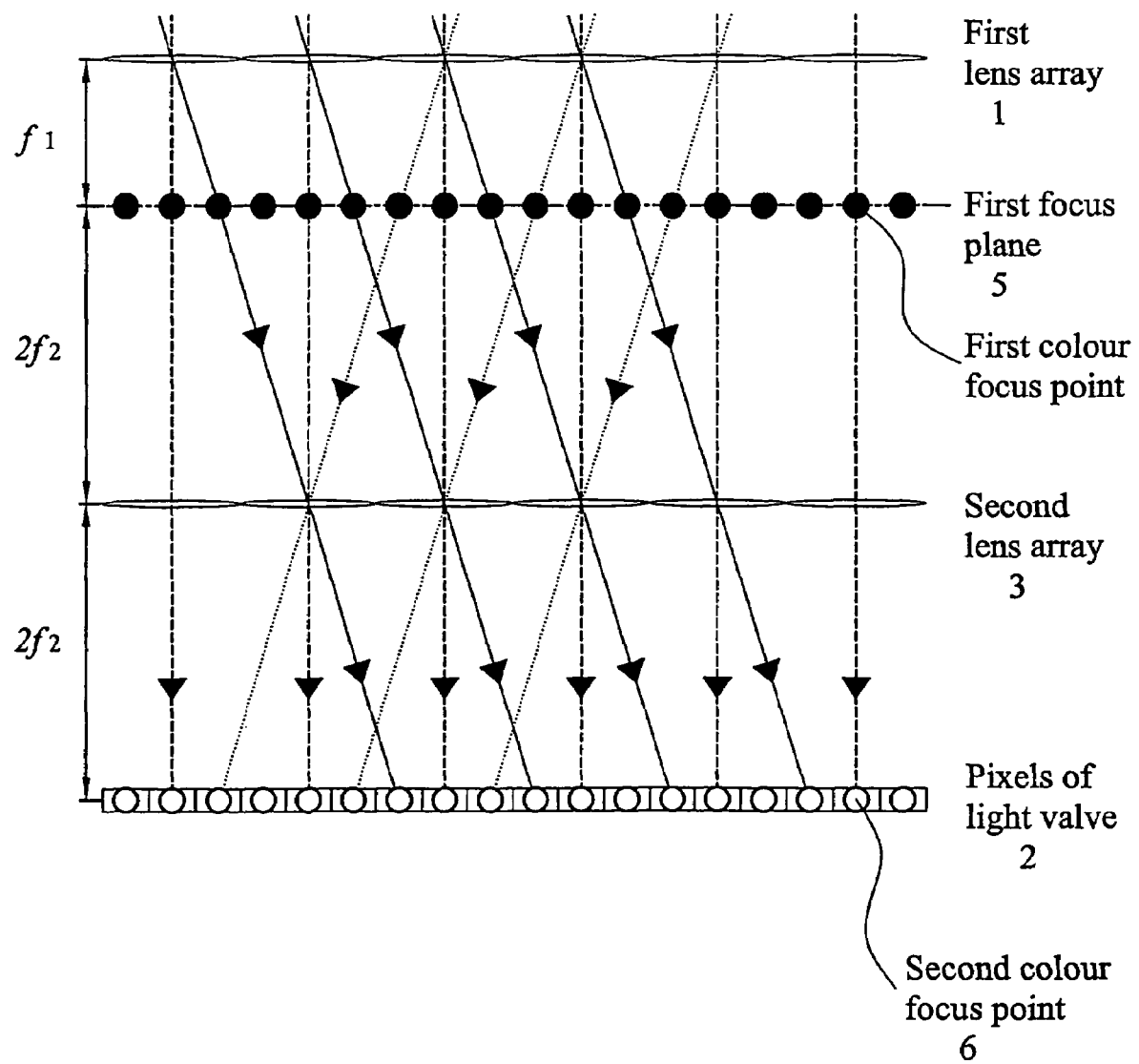
FIG. 4 illustrates diagrammatically a double microlens array arrangement for focusing light onto pixels.

FIG. 4 illustrates an alternative optical system comprising first and second lens arrays 1 and 3. The first lens array 1 is equivalent to the lens array shown in FIG. 1 and has a focal length $f_1$. Light incident at different angles or in different angular ranges on the first array 1 is focused to points such as 4 in a first focal plane 5.

The second lens array 3 is disposed between the first array 1 and the light valve 2 and has a focal length $f_2$. The components are arranged such that the array 3 is spaced from each of the first plane 5 and the pixel plane of the light valve 2 by twice its focal length so that the second array 3 forms images such as 6 at the pixels of the points 4.

Such an arrangement has the advantage that the first lens array 1 may have a small f-number, thus increasing the system etendue and hence the brightness of the projected image. The second lens array 3 may have a relatively large f-number and allows the lenses to be separated by a relatively large distance to $f_2$ from the pixel plane. The lens arrays may therefore be manufactured separately from the light valve 2 to allow commercially available light valves to be used.

Figure 5:
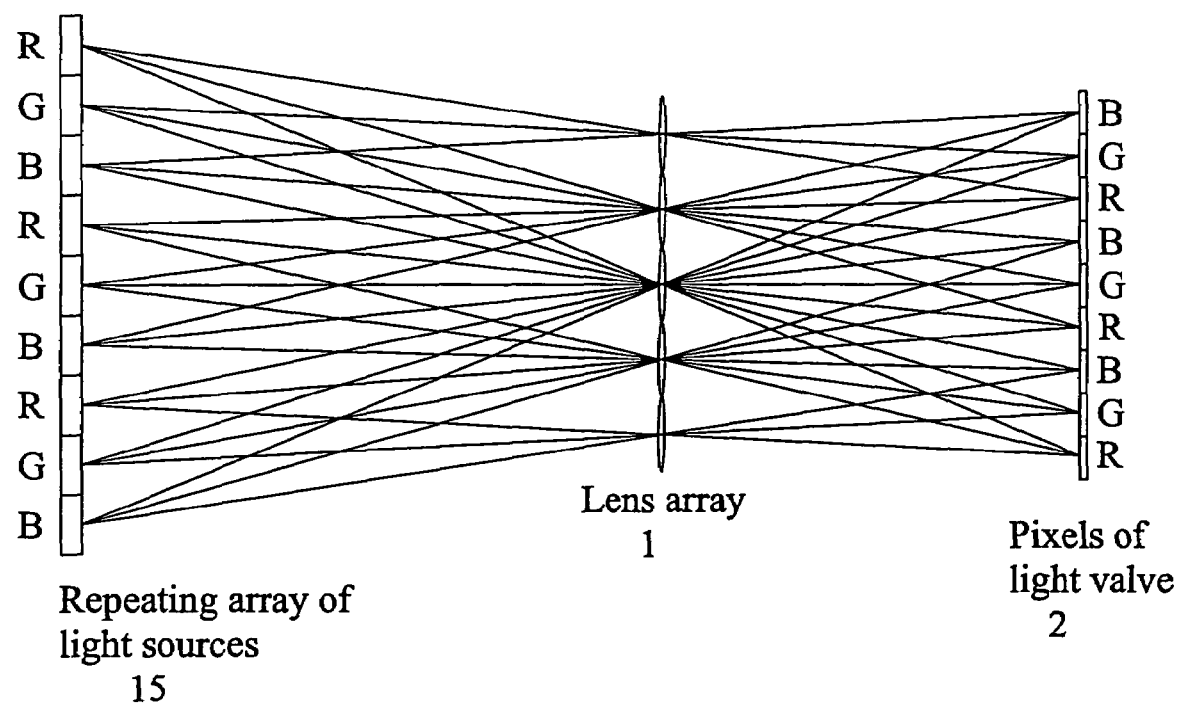
FIG. 5 illustrates diagrammatically an illumination system using a repeating array of light sources in a time-sequential colour projector.

FIG. 5 illustrates another projector light source arrangement comprising an array 15 of light sources cooperating with a lens array 1 to focus light onto the pixels of the light valve 2. The array 15 may be a one-dimensional array as illustrated in FIG. 5 or a two-dimensional array as described hereinafter. Each of the light sources is controllable to supply light of two or three different colours during different time frames with the pattern of colours for one such time frame being indicated in FIG. 5. An advantage of such an arrangement is that the angle subtended by each individual light source (or row of light sources for a two-dimensional array) is relatively small so that the lens array 1 may be disposed further from the light valve 2 than in the arrangement illustrated in FIG. 1 where only three light sources are used. Thus, the lens array 1 may be manufactured separately from the light valve 2.

Figure 6:
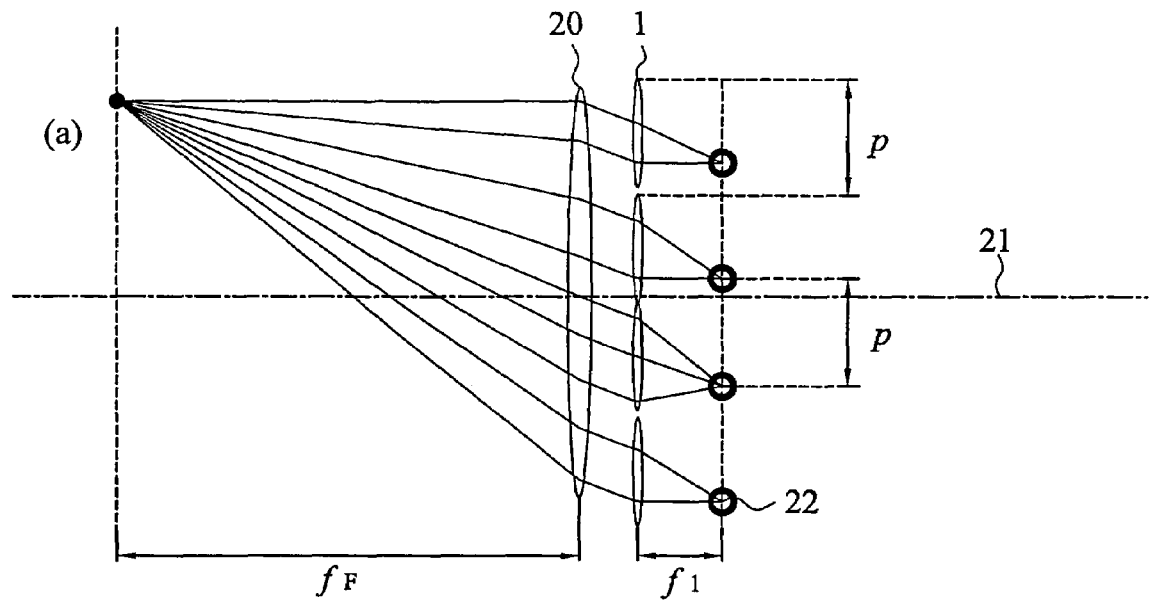
FIG. 6 illustrates diagrammatically two examples of arrangements for focusing light from localised light sources to periodic arrays of spots.
Figure 6:
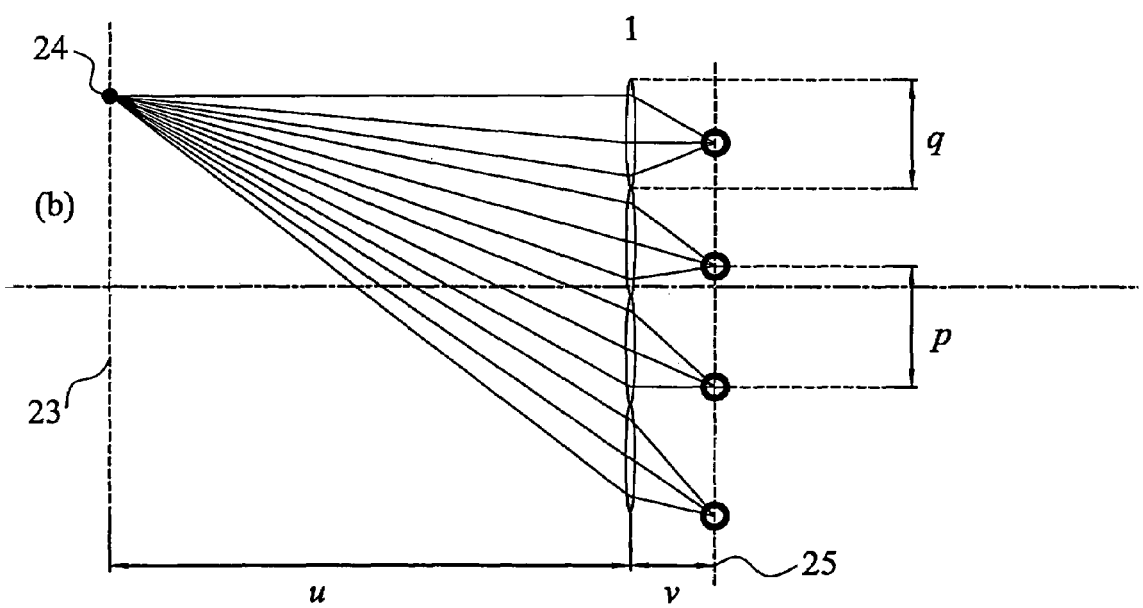

In the arrangements described with reference to FIGS. 1 and 4, the optical system focuses light incident in a particular direction to a point on the light valve. However, in practice, light is emitted by sources occupying particular locations in space rather than sources emitting light at particular angles. In order to take account of this, a field lens 20 as illustrated in FIG. 6 at (a) may be disposed between the light sources and the optical system, exemplified by the single lens array 1 in FIG. 6. The field lens has a focal length $f_F$ and is disposed close to the plane of the lens array 1 so that light emitted from any point in the plane of the light sources is collimated by the field lens 20 so as to be directed at a substantially common angle to the optical axis 21 of this part of the projector. The lens array 1 focuses light from the field lens 20 to a set of points indicated by the circles such as 22 in the focal plane of the array 1. The points 22 are spaced apart with a period p which is substantially equal to the period of the lens array.

An alternative technique for focusing light from a point source to a regularly spaced sequence of points is illustrated at (b) in FIG. 6. The lens array 1 is spaced from the plane 23 containing the point light source 24 by a distance u and from the plane 25 of the light valve pixels by a distance v such that the plane 25 is conjugate to the plane 23. This is achieved by setting the distances u and v in accordance with:

$$\frac{1}{u} + \frac{1}{v} = \frac{1}{f_1},$$

where $f_1$ is the focal length of the array 1. In order to provide a set of image points with a pitch p, the pitch of the lens array is made smaller than p and is given by:

$$q = \frac{pu}{u+v}.$$

The lens arrays 1 shown at (a) and (b) in FIG. 6 may be a single lens array optical system, as illustrated in FIG. 1, or may be the first lens array of a double array system as illustrated in FIG. 4.

In the arrangement shown at (a), the pitch of the lens array is substantially exactly three times the pixel pitch of the light valve. Such an arrangement therefore simplifies alignment of the system. Also, light passes through all lenses of the array 1 in the same way. In the arrangement illustrated at (b), lenses towards the edge of the array 1 may allow light to pass through at large angles where optical aberrations may result in reduced optical efficiency. However, the arrangement shown at (b) has fewer components, which reduces cost and the number of optical surfaces where reflection and hence light loss may occur.

As described in more detail hereinafter, the light sources may comprise multi-colour light emitters or single-colour light emitters with arrangements for directing the light from each of the emitters from the same surface and/or in the same direction or range of angles. In the case of multi-colour light emitters, the emitters can be switched electronically to produce light of different colours. Use of this type of source may allow cost to be reduced and the projector size to be reduced. Such light sources may, for example, comprise light emitting diodes or other semiconductor light producing elements of different colours disposed close together.

It is also possible to integrate different colours of emission on the same chip, using methods such as those described by Luo et al, 'Patterned three-colour ZnCdSe/ZnCdMgSe quantum-well structures for integrated full-colour and white light emitters', *Applied Physics Letters* vol 77 pp. 4259-4261 (2000). Layers emitting different colours may also be stacked vertically, as disclosed in U.S. Pat. No. 5,721,160, Z. Shen et al, 'Three-colour, tunable, organic light-emitting devices', *Science* vol 276, p. 2009, 1997, P. E. Burrows et al, 'Achieving full-colour organic light emitting devices for lightweight, flat-panel displays', *IEEE Transactions on Electronic Devices* vol 44 p. 1188, 1997) and A. J. Steckl et al, *Materials science and engineering* vol B81, p97 (2001).

In the case of single-colour emitters, the light emitters may, for example, be single colour light emitting diodes. Light from a group of such emitters is caused to emerge in the same way, for example using colour-selected reflecting elements such as dichroic mirrors or cross-dichroic prisms. An advantage of single-colour light emitters is that they are presently more widely available and have a higher light output. Also, each emitter is switched on for only one third or one half of a complete image refresh cycle so that less cooling of the light sources is required.

The light emitters may be of any suitable electronic type capable of being switched on and off electronically. Such light emitters may comprise solid state or semiconductor devices and suitable examples include light emitting diodes, lasers, including laser diodes for example edge-emitting or vertically-emitting types, superluminescent diodes and resonant cavity light emitting diodes. The light emitters may be of a type that emits only one primary colour at any one time and which can be rapidly switched on or off (for example, for single-colour light emitters) or rapidly switched from one colour to another (for multi-colour light emitters). Examples of such rapid-switching emitters include light emitting diodes and lasers as mentioned above, but also include such arrangements as broadband lamps cooperating with rapid-switching filters, or narrow emission band emitters such as neon lamps. Also suitable are devices that use fluorescence or non-linear optical effects to convert from one colour to another, such as LEDs employing phosphors, frequency-doubled lasers and photonic-crystal based devices.

Figure 7:
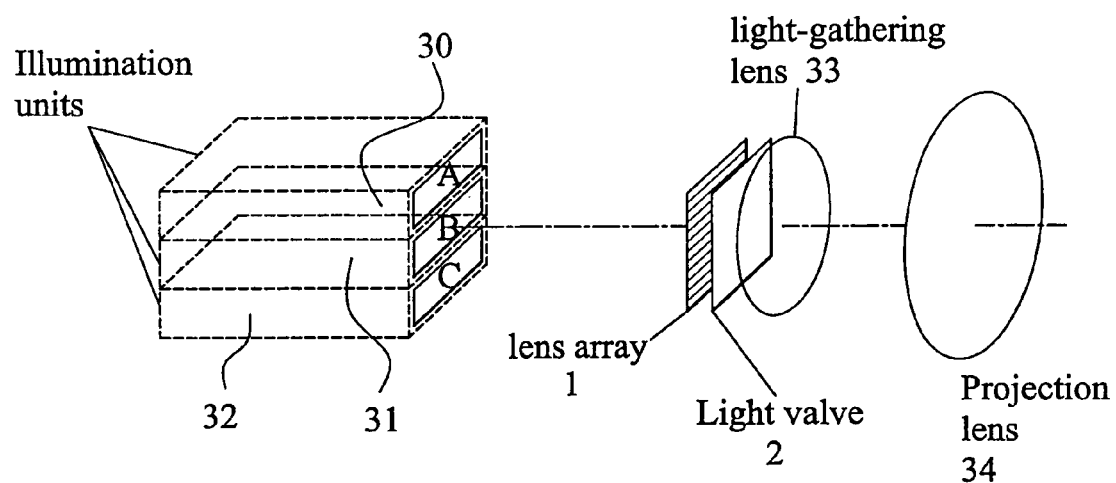
FIG. 7 is a diagram illustrating a time-sequential colour projector constituting a first embodiment of the invention.

FIG. 7 illustrates diagrammatically a the optical system of a projector using a single lens array optical system of the type illustrated in FIG. 1 and at (b) in FIG. 6 using the pixel colour sequence illustrated at (a) in FIG. 2. The projector comprises three illumination units or light sources 30, 31 and 32 having light output surfaces A, B and C, respectively, which are horizontally elongate. Each light source contains one or more light emitters and other components as necessary and examples of suitable light sources are described hereinafter. Each light source is controllable to emit red, green or blue light and the sources are controlled such that, in first, second and third time frames, the source 30 emits blue, green and red light, respectively, the sources 31 emits green, red and blue light, respectively, and the source 32 emits red, blue and green light, respectively.

The light sources 30 to 32 direct light onto the lens array 1, which comprises an array of cylindrically converging lenses with the cylindrical axis extending horizontally. The vertical pitch of the lenses of the array 1 is slightly less than the vertical pitch of the pixels of the light valve 2 as described hereinbefore with reference to the arrangement shown at (b) in FIG. 6, such that light from the light sources 30 to 32 is focussed on respective sets of pixels of the light valve 2. FIG. 1 represents a diagrammatic side view of two of the lenses of the array 1 of FIG. 7 and the six associated rows of pixels. The light incident on the light valve 2 is modulated in accordance with the appropriate images in synchronism with the switching of the colours of the light sources 30 to 32.

A composite colour image or frame is made up of three time-sequential frames, each of which comprises interlaced rows from three colour component images. Modulated light from the light valve 2 is gathered by light-gathering lens 33 and supplied to a projection lens 34, which projects the image on a front or rear projection screen (not shown). The light gathering lens 33 changes the direction of light emerging from the light valve 2 so that the aperture of the projection lens 34 is used efficiently.

Each displayed composite image or frame is displayed with the full spatial resolution of the light valve 2 for each colour component image. The light sources 30 to 32 and the individual or sub-images displayed by the light valve 2 are switched at a sufficiently high rate, for example approximately three times the normal video rate, so that a viewer perceives a single full-colour image or frame.

Figure 8:
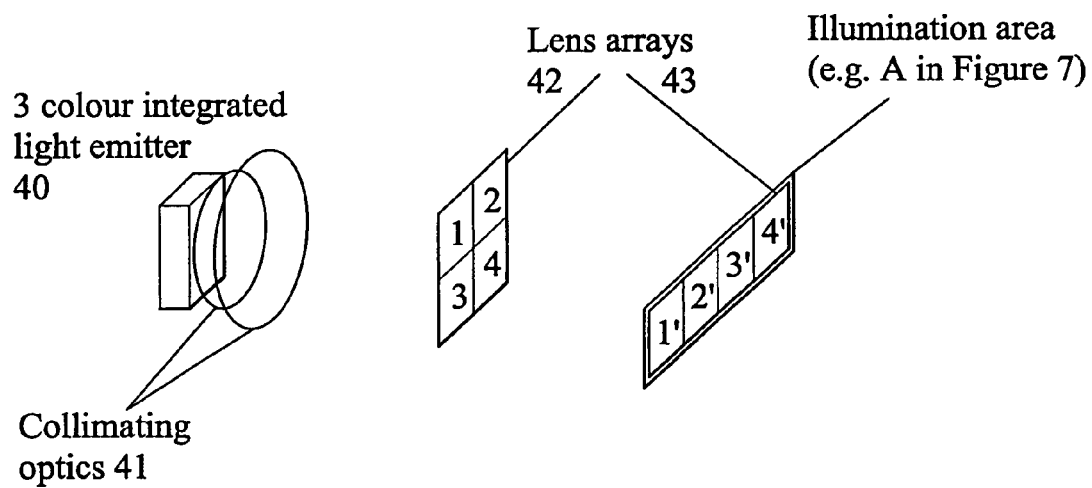
FIGS. 8 to 11 illustrate diagrammatically examples of light sources which may be used in the projector of FIG. 7.

FIG. 8 illustrates an example of a light source which may be used as each of the light sources 30 to 32. The light source comprises an integrated three-colour light emitter, which is switched electronically to produce red, green or blue light. Light from the emitter 40 is substantially collimated by collimating optics 41 and directed to lens array 42 and 43. The lens array 42 comprises a two-by-two two-dimensional array of four spherically converging lenses (labelled 1, 2, 3 and 4), which focus the incident light to spots at the centres of respective lenses (labelled 1', 2', 3' and 4') of the array 43. The array 43 comprises a one-dimensional array of cylindrically converging lenses effectively forming the output surface, such as A in the case of the light source 30 in FIG. 7. Each lens of the array 43 forms an image of the respective lens of the array 42 on the lens array 1. In particular, each of the lenses of the array 42 has the same height-to-width or aspect ratio as the array 1 and light valve 2 and the optical system is arranged so that the image of each lens of the array 42 covers or fills the light valve 2. Such an arrangement provides a substantially uniform pattern of illumination on the lens array 1 so that the resulting projected image is of uniform brightness. Also, the range of angles from which the lens array 1 is illuminated is wide in the horizontal direction and narrow in the vertical direction and this allows three such light sources 30, 31 and 32 to be stacked vertically as shown in FIG. 7 and to use the available etendue of the light valve system efficiently.

Figure 9:
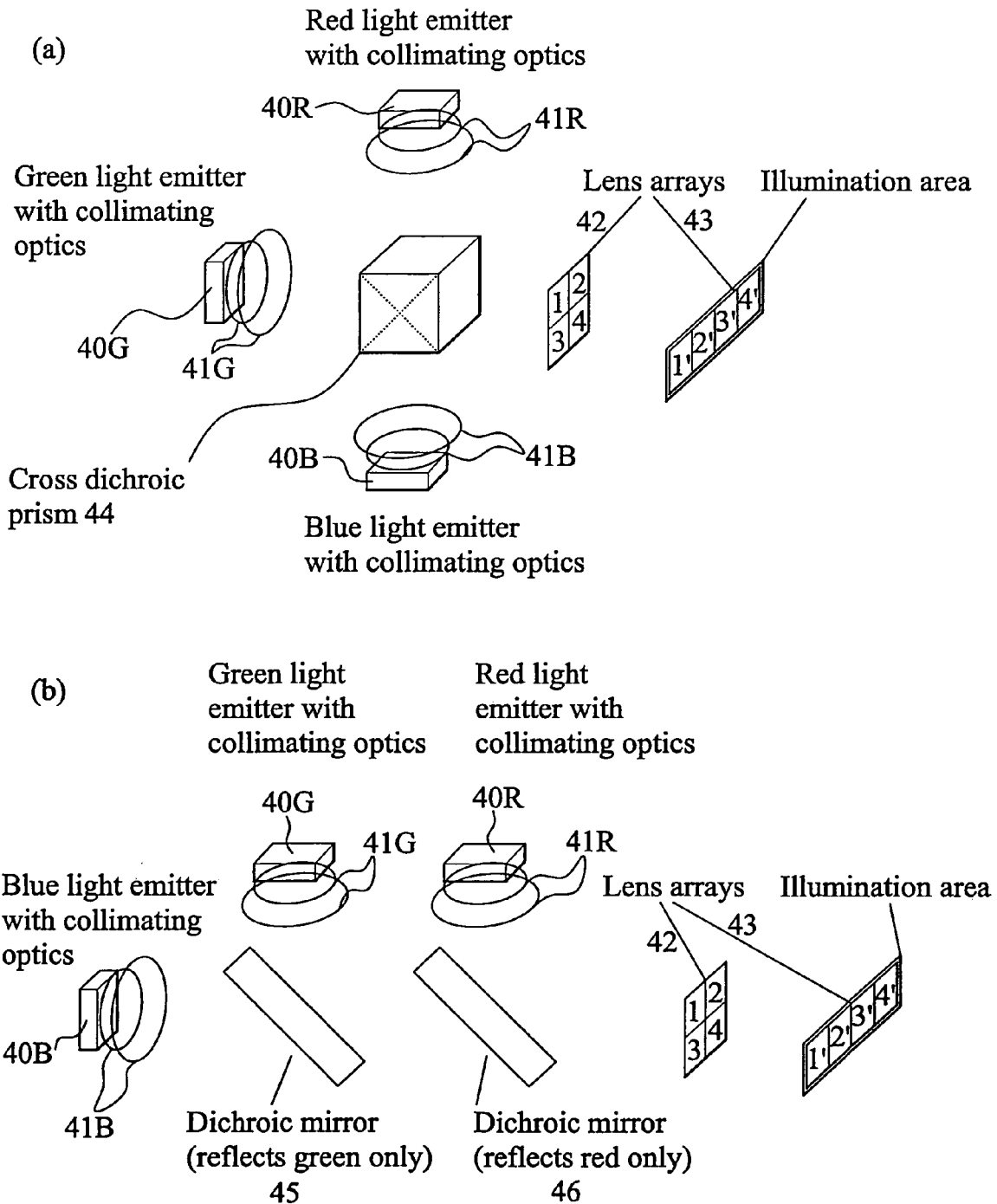

FIG. 9 illustrates at (a) an alternative arrangement suitable for each of the light sources 30 to 32 of FIG. 7. This light source differs from that shown in FIG. 8 in that the three colour integrated light emitter 40 is replaced by three single colour red, green and blue light emitters 40R, 40G and 40B with associated collimating optics 41R, 41G and 41B. The light emitters and collimating optics direct light into three input faces of a cross dichroic prism, which directs light from the three emitters along a common output light path to the lens arrays 42 and 43.

FIG. 9 shows at (b) another light source arrangement which differs from that shown at (a) in FIG. 9 in that the cross dichroic prism 44 is replaced by dichroic mirrors performing the same function of directing light from the light emitters along a common path to the lens arrays 42 and 43.

Figure 10:
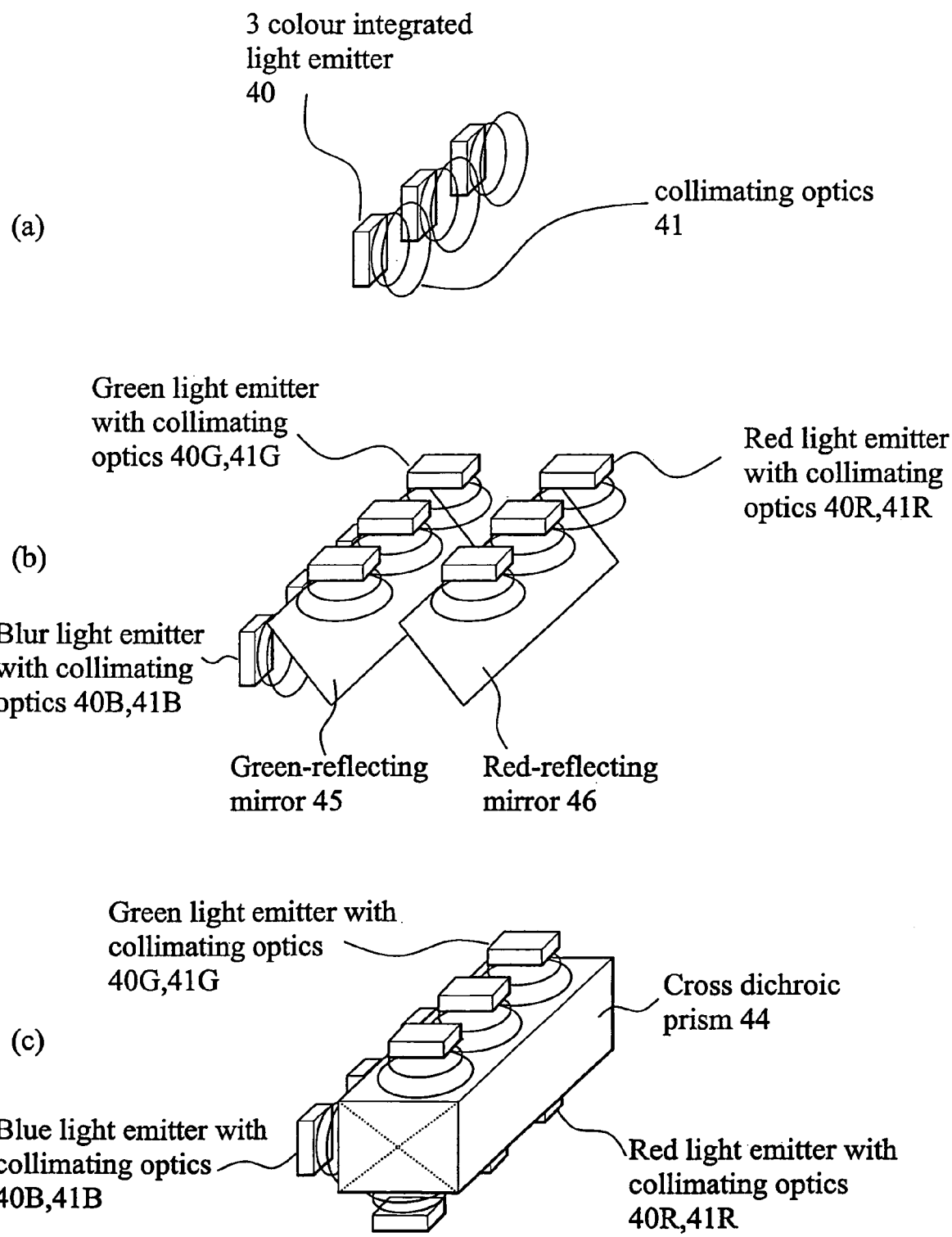

FIG. 10 shows at (a) a light source which differs from that shown in FIG. 8 in that the lens arrays 42 and 43 are omitted and the emitter 40 and the collimating optics 41 and multiplicated so as to form a linear horizontal array forming the horizontally elongate output surface of the light source. Similarly, the light sources illustrated at (b) and (c) differ from those shown at (b) and (a) in FIG. 9 in that the lens arrays are omitted and the light emitters are horizontally multiplicated. Each of the light sources shown in FIG. 10 may be provided with a homogeniser for providing more uniform light distribution at the light valve 2. Such a homogeniser may, for example, comprise a double lens array or an integrating rod. Also, each of the light sources shown in FIG. 8 to 10 may include a polarisation conversion system for converting substantially all of the light emitted by the light emitters to a single uniform polarisation to match the input light requirements of the light valve. Suitable systems are disclosed, for example, in Stupp & Brennesholtz, "Projection displays", Wiley 1999, and Itoh et al, "Ultra-high efficiency LC projector using polarised light illuminating system", SID digest of technical papers, vol 28, pp 993-996, 1998.

Figure 11:
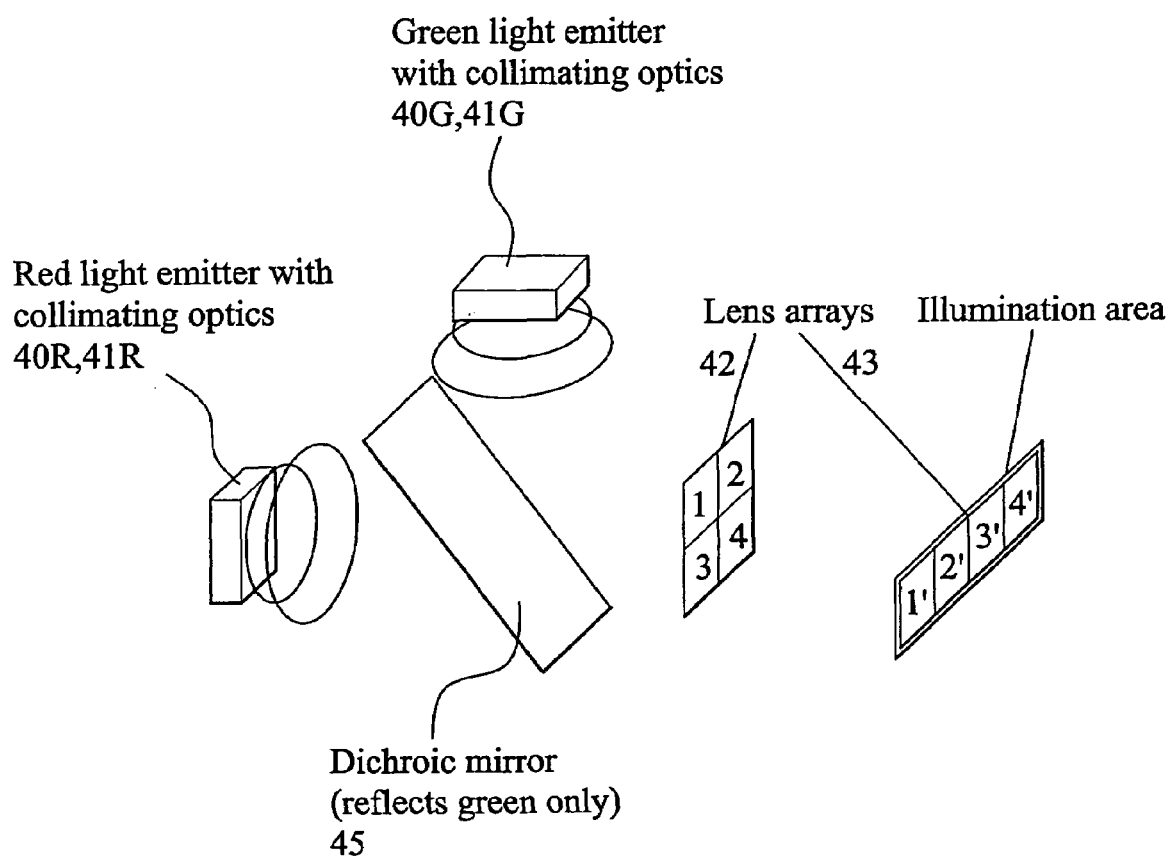

The projector shown in FIG. 7 may alternatively be used to operate in accordance with the pixel colour sequences illustrated in FIG. 3 and the light sources shown in FIGS. 8 to 10 may be modified accordingly. For example, in order to perform the sequence illustrated at (a) of FIG. 3, the light source shown at (b) in FIG. 9 may be modified as shown in FIG. 11 and used as each of the light sources 30 and 31 to supply green or red light, whereas the light source 32 supplies only blue light. Thus, for each of the light sources 30 and 31, only red and green light emitters and collimating optics together with a single dichroic mirror are required. The light source 32 may have the arrangement shown in FIG. 8 but with the light emitter 40 emitting only blue light.

Figure 12:
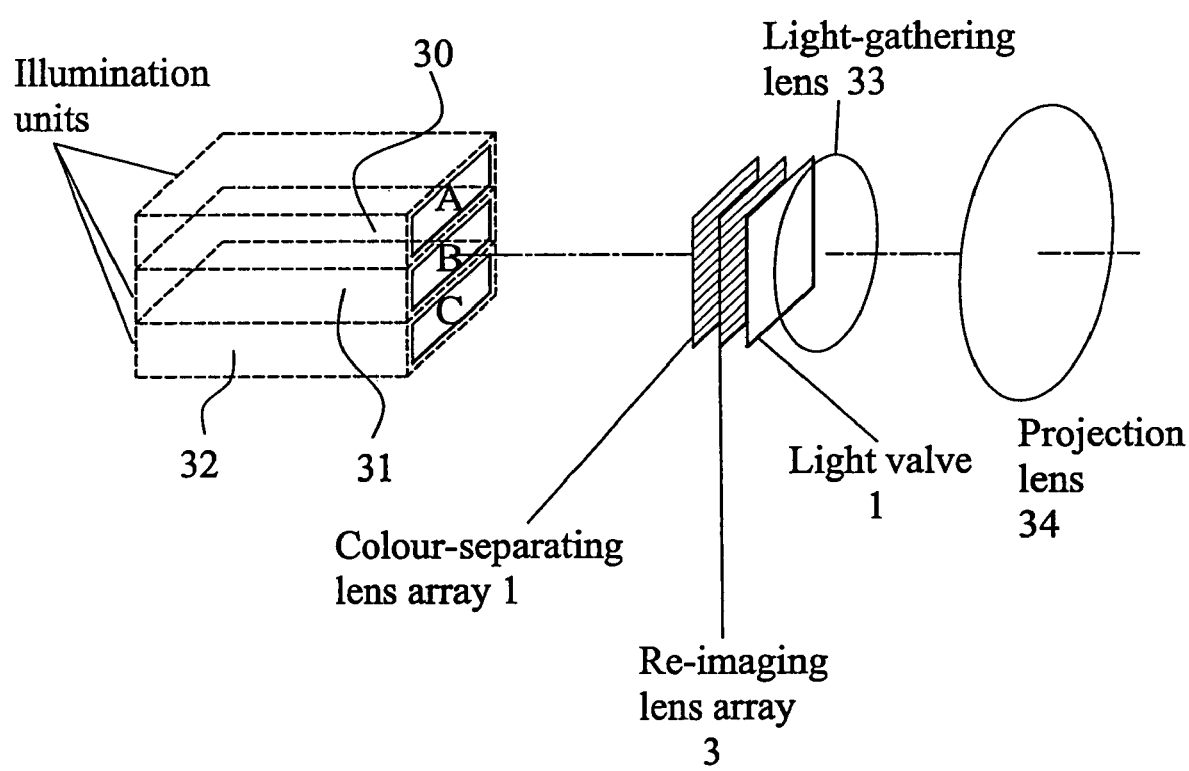
FIG. 12 illustrates diagrammatically a time-sequential colour projector constituting a second embodiment of the invention.

FIG. 12 illustrates a time-sequential colour projector which differs from that shown in FIG. 7 in that the optical system comprises two lens arrays as illustrated in FIG. 4.

Figure 13:
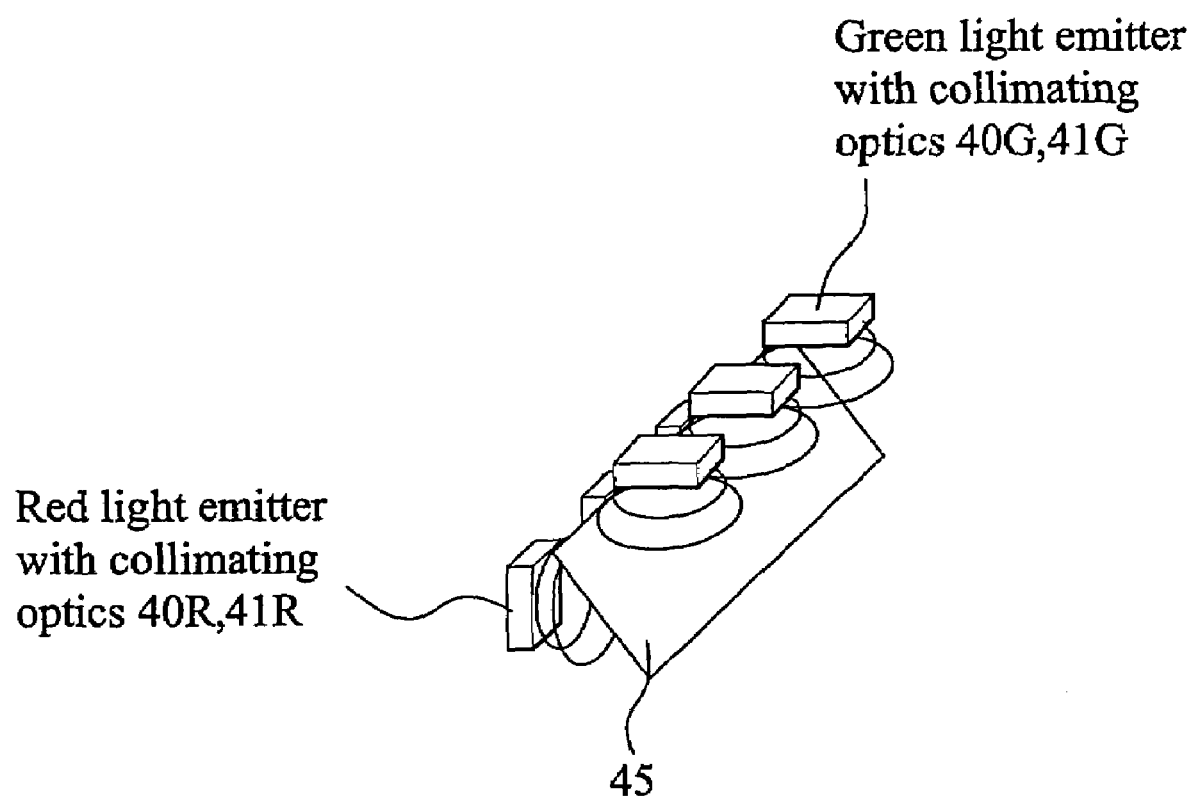
FIG. 13 illustrates diagrammatically an example of another light source for use in a projector constituting an embodiment of the invention.

FIG. 13 illustrates a two colour light source which differs from that shown at (b) in FIG. 10 in that the blue light emitters and collimating optics together with the red-reflecting mirror are omitted.

Figure 14:
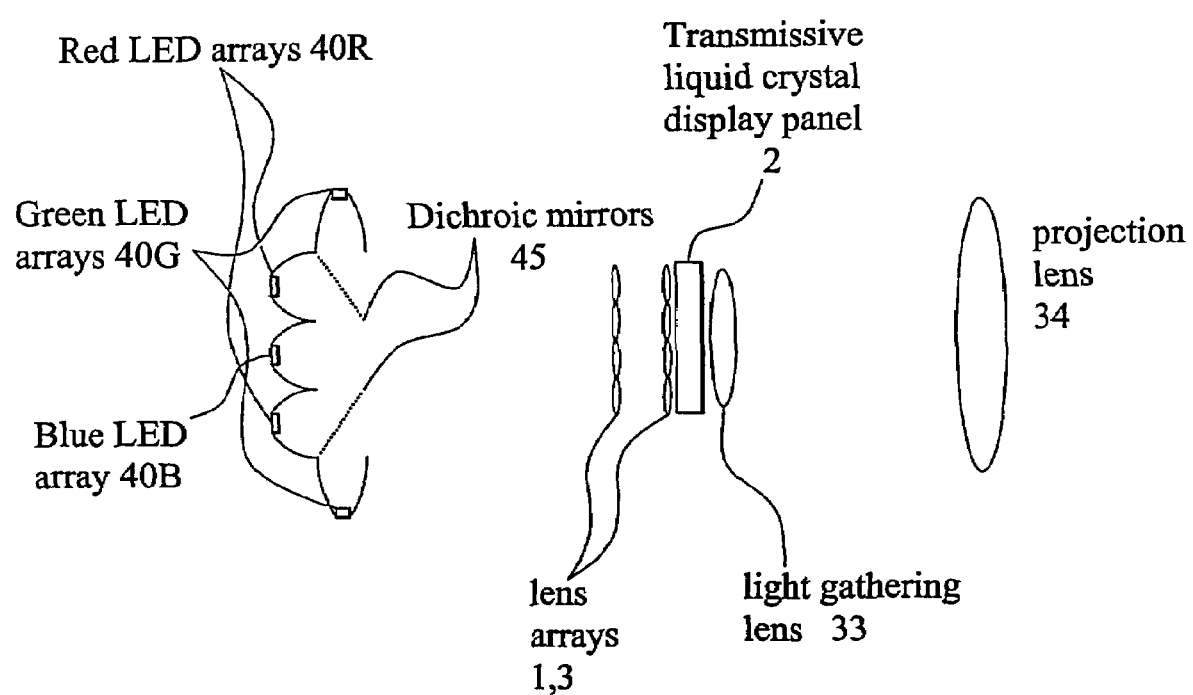
FIG. 14 illustrates diagrammatically a time-sequential colour projector constituting a third embodiment of the invention.

FIG. 14 illustrates a time-sequential colour projector of the type shown in FIG. 12 but with two light sources of the type shown in FIG. 13 and with a light source for supplying only blue light, for performing pixel colour sequencing of a type similar to that illustrated at (a) in FIG. 3.

Figure 15:
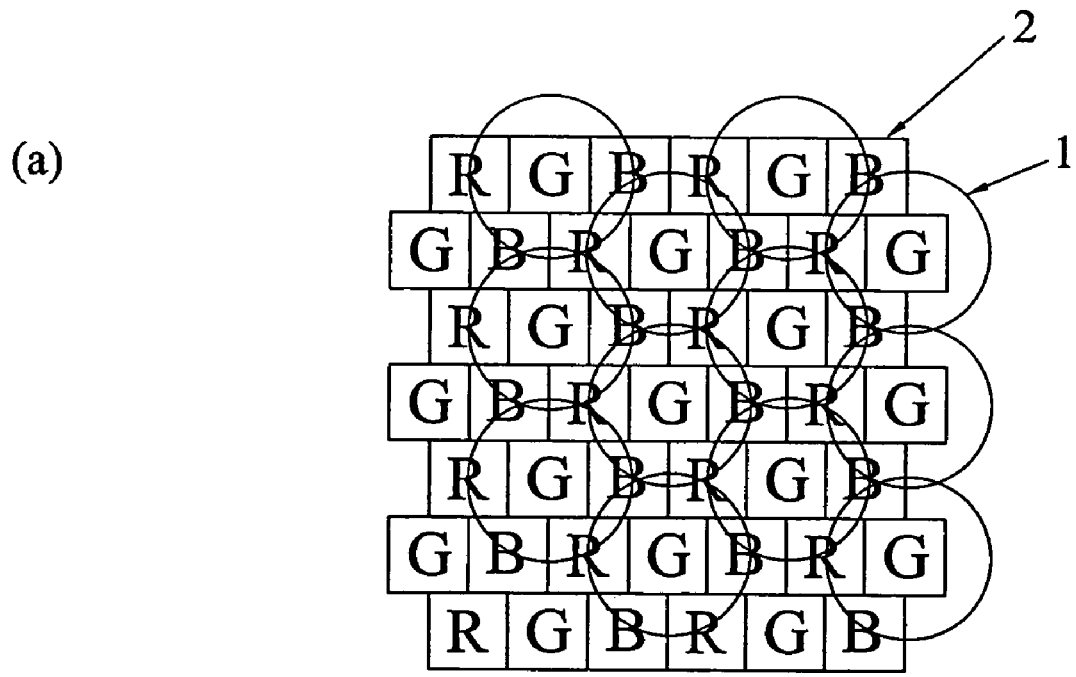
FIG. 15 illustrates diagrammatically two examples of lens array and pixel configurations for use in a projector constituting an embodiment of the invention.
Figure 15:
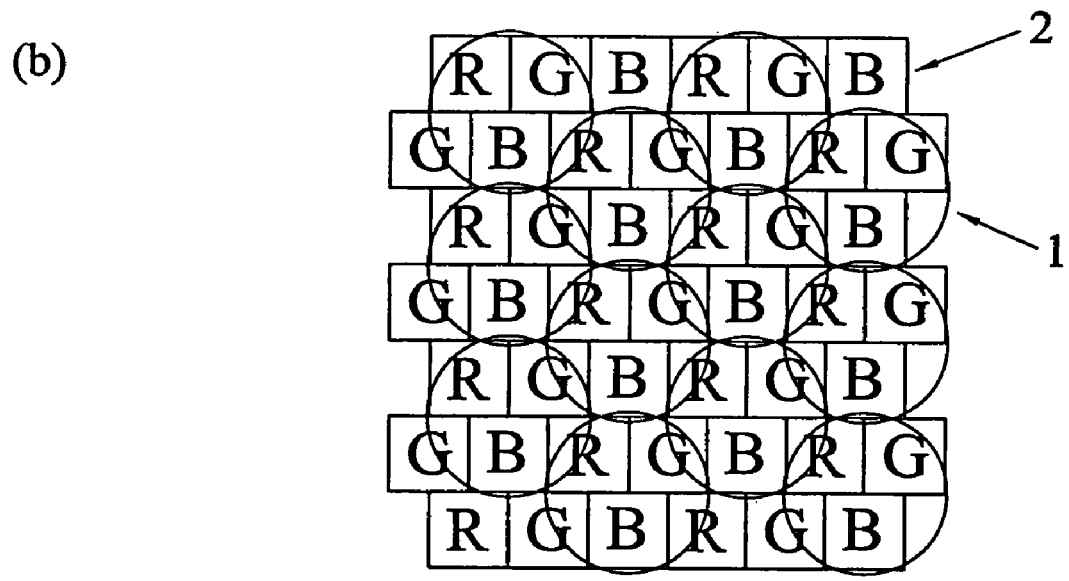
Figure 16:
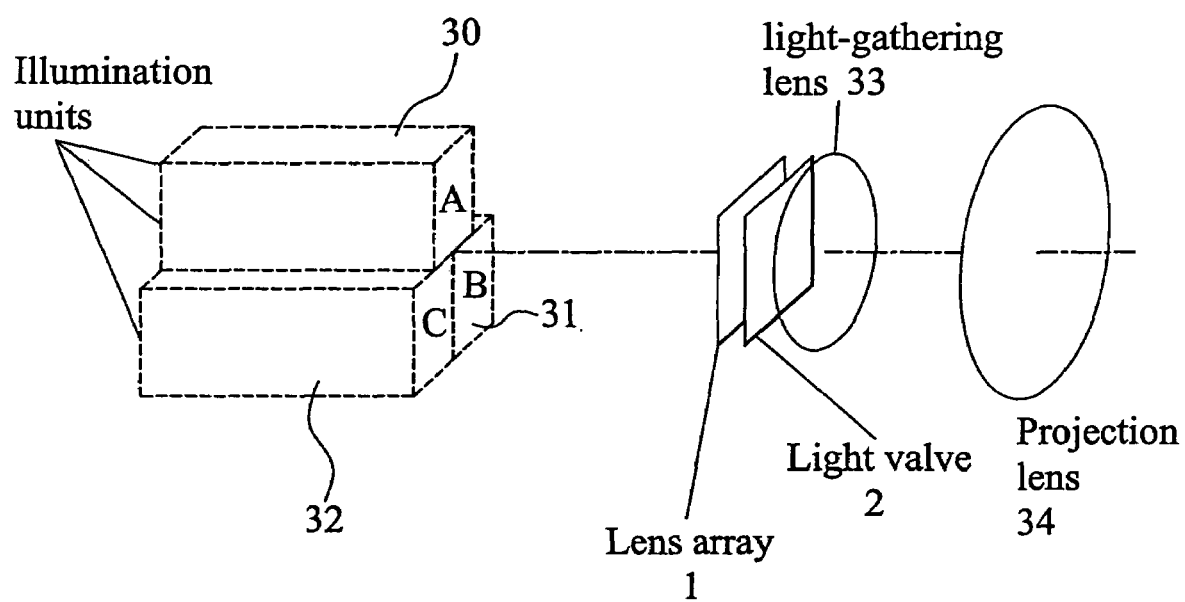
FIG. 16 illustrates a time-sequential colour projector constituting a fourth embodiment of the invention and including an arrangement of the type illustrated in FIG. 15.

The lens arrays 1 and 2 described hereinbefore are cylindrical lens arrays but other types of lens arrays may be used. For example, FIG. 15 illustrates at (a) and (b) hexagonal arrays of lenses having circularly symmetrical optical properties to form spherically converging lenses. The pixel colours for one frame are again indicated by R, G and B for red, green and blue light. In the arrangement shown at (a) in FIG. 15, each lens gathers light for three pixels in a horizontal row and such an arrangement may be used, for example, in a projector of the type shown in FIG. 7. In the arrangement illustrated at (b) in FIG. 15, each lens gathers light for three pixels arranged in a triangle and such an arrangement may be used in a time-sequential colour projector of the type shown in FIG. 16. This projector differs from that shown in FIG. 7 in the output surface shape and relative positions of the light sources 30 to 32. In particular, the output surfaces are arranged in a triangle so as to be focused by each lens of the array 1 onto a corresponding triangular arrangement of three pixels. Instead of elongate output surfaces, the light sources have output surfaces which are of substantially the same shape as the pixels of the light valve 2.

Figure 17:
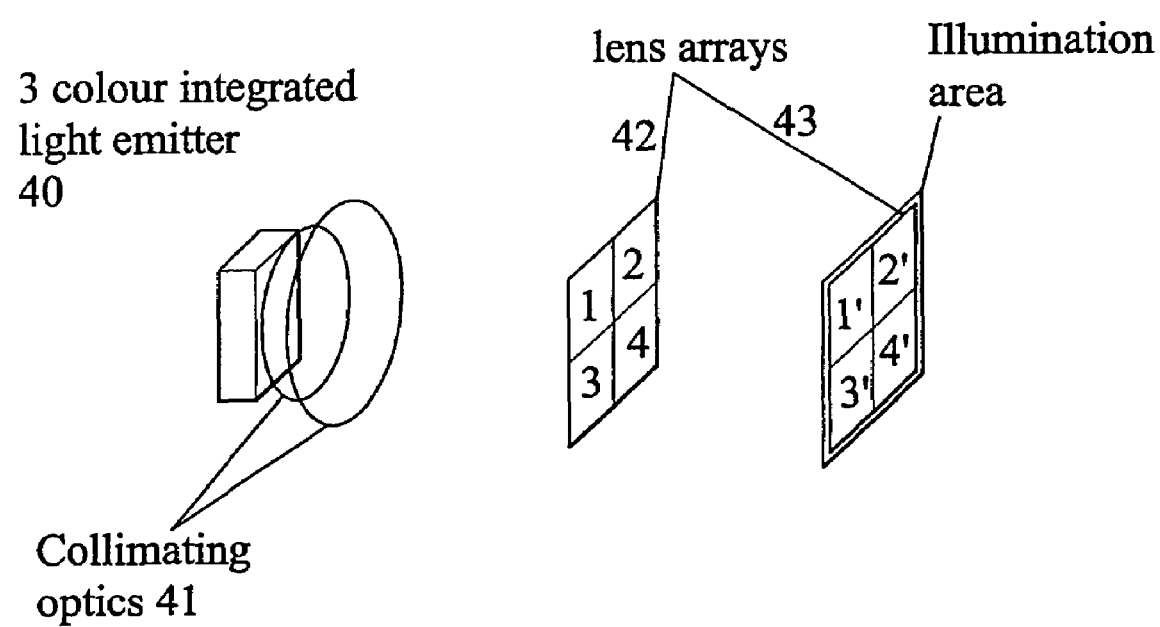
FIGS. 17 to 19 illustrate diagrammatically light sources suitable for use in the projector of FIG. 16.
Figure 18:
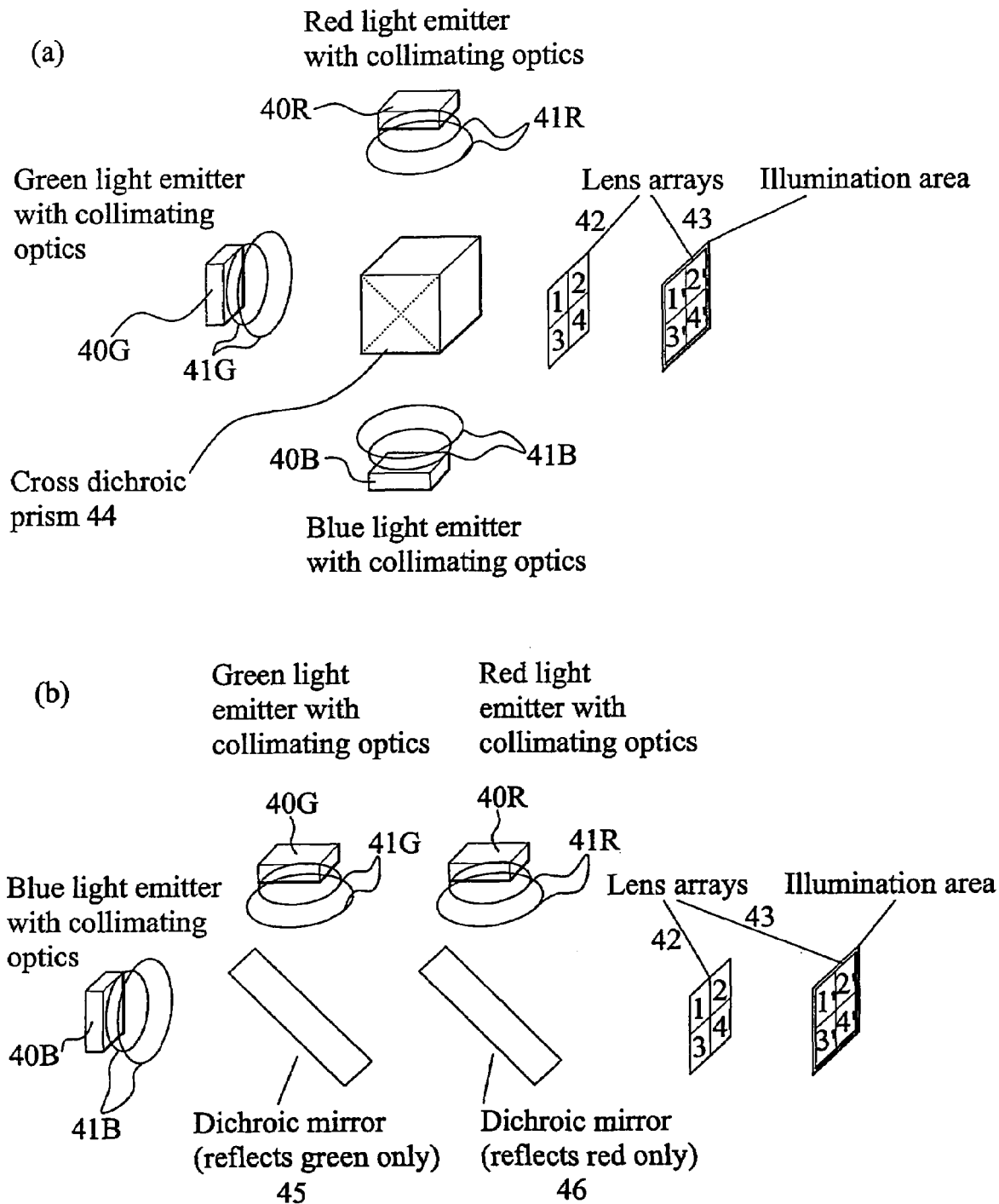
Figure 19:
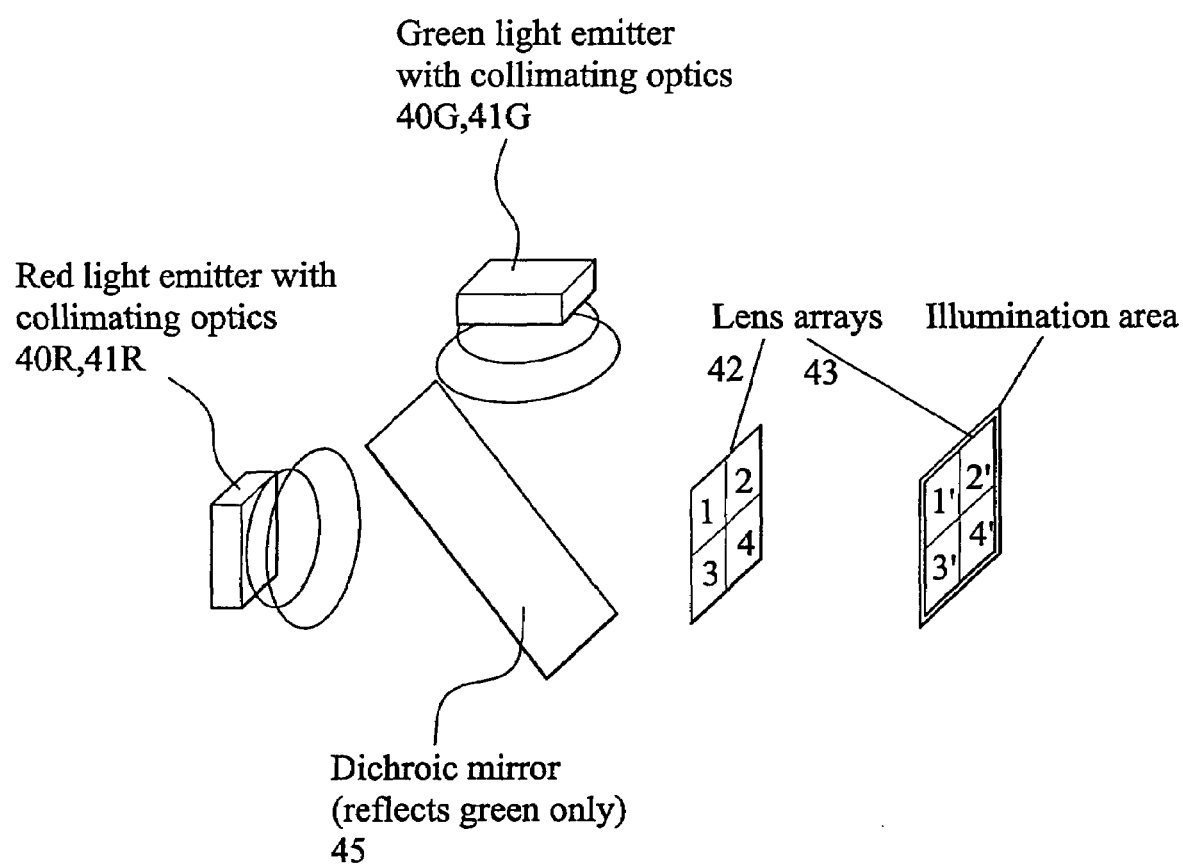

FIG. 17 illustrates a light source for use in the projector of FIG. 17, which light source differs from that shown in FIG. 8 in that the second lens array 43 comprises a two-by-two two-dimensional array. Similarly, the light sources shown in FIG. 18 at (a) and (b) differ from those shown at (a) and (b), respectively, in FIG. 9 in that they have the same arrangement of lens array 43 as shown in FIG. 17. Likewise, the two colour light source shown in FIG. 19 differs from that shown in FIG. 11 in that it has the lens array 43 of FIG. 17.

Figure 20:
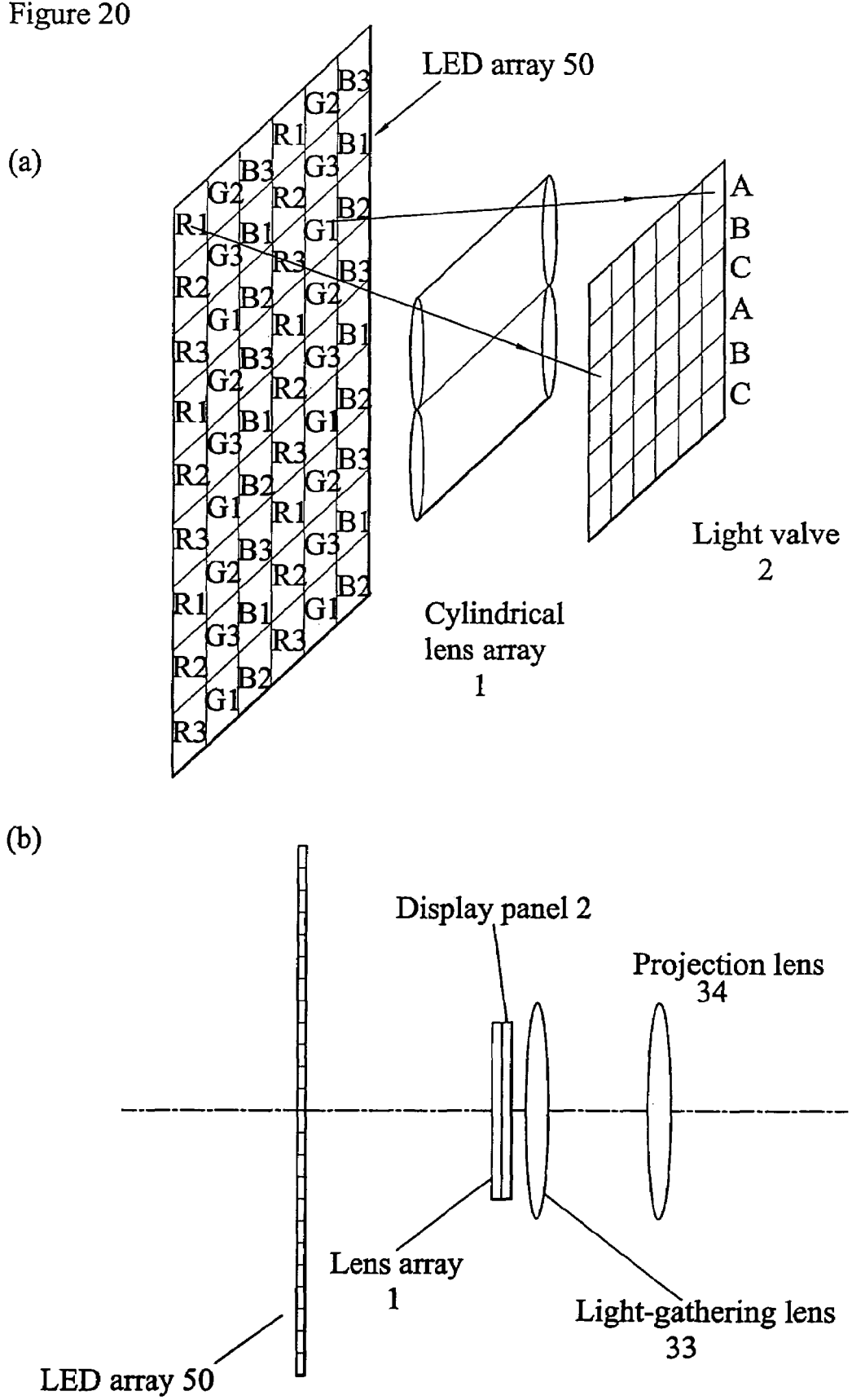
FIG. 20 illustrates diagrammatically a time-sequential colour projector constituting a fifth embodiment of the invention.

FIG. 20 illustrates a time-sequential colour projector comprising a repeating array of small light sources of a type similar to that shown in FIG. 5. Such an arrangement allows a single lens array 1 to be disposed at a larger distance from the light valve 2. The light source 50 is illustrated as a light emitting diode (LED) array with individual LEDs arranged in rows and columns. Each column comprises LEDs of the same colour and the columns are arranged as a repeating sequence of red, green and blue columns. The LED colours are indicated by R for red, G for green and B for blue with a subscript indicating in which of three consecutive sub-frames of a complete frame the LED is switched on. Thus, in frame 1, the LEDs labelled R1, G1 and B1 are switched on, in a second frame the LEDs labelled R2, G2 and B2 are switched on and, in the third frame, the LEDs labelled R3, G3 and B3 are switched on. The cylindrical lens array 1 focuses light from the LEDs so that, in frame 1, rows A, B and C of the light valve pixels are illuminated with green, blue and red light, respectively. In the second frame, rows A are blue, rows B are red and rows C are green. In the third frame, rows A are red, rows B are green and rows C are blue.

Because horizontal cylindrically converging lens are used in the lens array 1, only the vertical position of each LED in the array 50 determine which pixels in the light valve 2 it illuminates. For example, LEDs labelled R2 illuminate all pixels in all rows B during the second time frame.

In a particular example of the projector as illustrated at (b) in FIG. 20, the array 50 comprises 24 rows of LEDs disposed as illustrated at (a) in FIG. 20. Each row is 1 mm high. The light valve 2 is a transmissive liquid crystal display panel with a pixel diameter of 20 micrometers spaced by 50 mm away from the LED array 50. The cylindrical lens array 1 has a focal length of approximately 1 mm with each lens having a diameter of approximately 60 micrometers. The array 1 is spaced from the pixel plane of the light valve 2 by approximately 1 mm.

By comparison with a corresponding example of a projector of the type illustrated in FIG. 7, each light source 30 to 32 would be 8 mm high. In order to focus the light from the light sources to stripes of 20 micrometer height on the light valve, the lens array 1 would have to be spaced from the panel by a distance of approximately 125 micrometers. This would be prevented by the presence of the glass substrate of the liquid crystal display panel.

Figure 21:
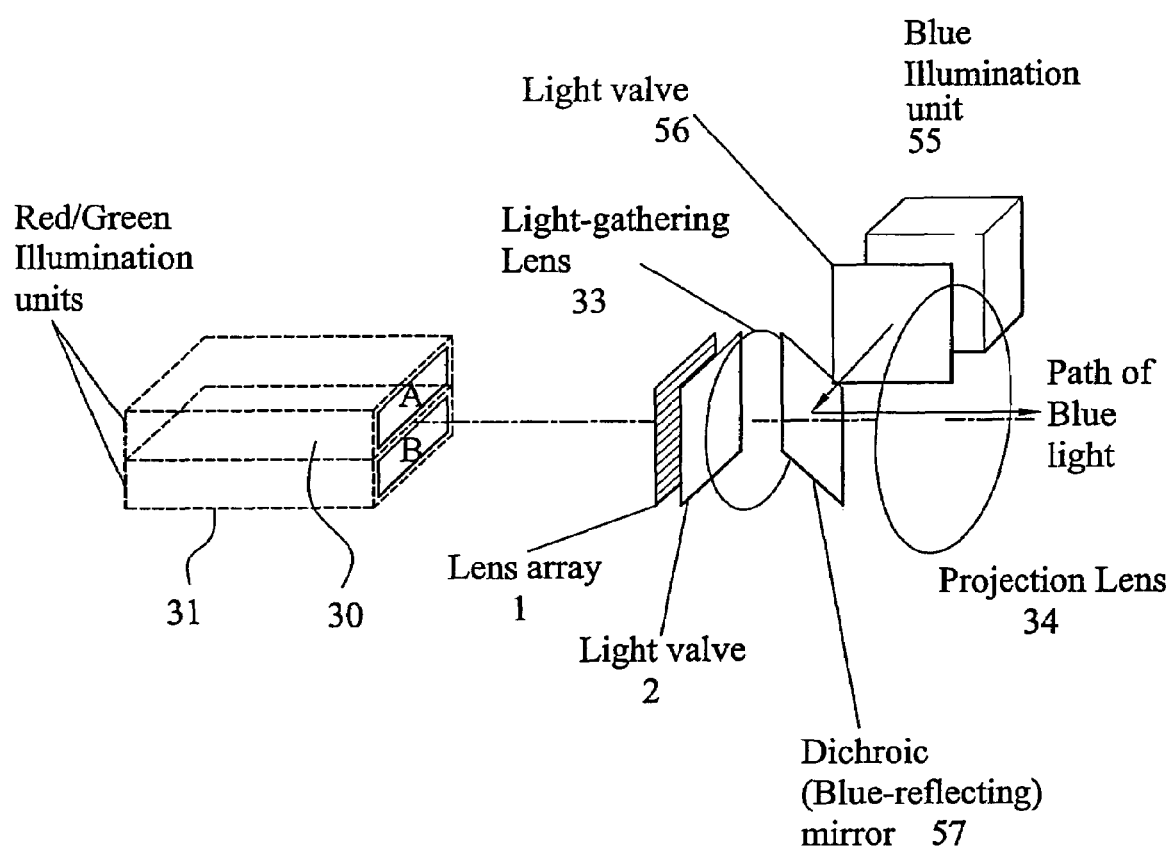
FIG. 21 illustrates diagrammatically a time-sequential colour projector constituting a sixth embodiment of the invention.

FIG. 21 illustrates a time-sequential colour projector which differs from the projectors described herein before in that the blue colour component of the composite images or frames is processed separately before the projection lens 34. The projector comprises light sources 30 and 31 of the red/green type, which may for example be any of the types described hereinbefore. Light from the output surfaces A and B is directed onto the lens array 1, which focuses light spots on the pixels of the light valve 2 as described hereinbefore. Only the red and green colour component images are displayed by the light valve 2, for example in accordance with the sequences illustrated in FIG. 3 but omitting all blue pixels. In fact, all of the pixels of the light valve 2 may be used to display the red and green colour image components, which are therefore displayed at the full spatial resolution of the light valve 2. Also, the light valve 2 is required to run only at twice the normal video rate. Modulated light from the light valve 2 is gathered by the lens 33 and passes through a dichroic blue-reflecting mirror 57 to the projection lens 34.

The projector comprises a further light source 55 which supplies only blue light. The light source 55 may be switched on continuously or may be briefly switched off when the blue colour component image is being changed or updated, for example in a frame blanking period.

Blue light from the light source 55 is directed, for example by any suitable optical system, through a light valve 56 which displays only the blue colour component of the image. Because the sensitivity of the human visual system to blue detail is lower than to red or green detail, the spatial resolution of the light valve 56 may be lower than that of the light valve 2 with no reduction in perceived detail in the projected image. Thus, the light valve 56 may be of lower cost that the light valve 2. Also, the light valve 56 need only operate at the standard video rate and this again allows cost to be reduced.

Light modulated by the light valve 56 is directed onto the dichroic mirror 57 and is reflected to the projection lens 34. By appropriately aligning the components of the projector, the blue image component is made to be in registration with the red and green image components in the composite image projected onto the display screen.

Figure 22:
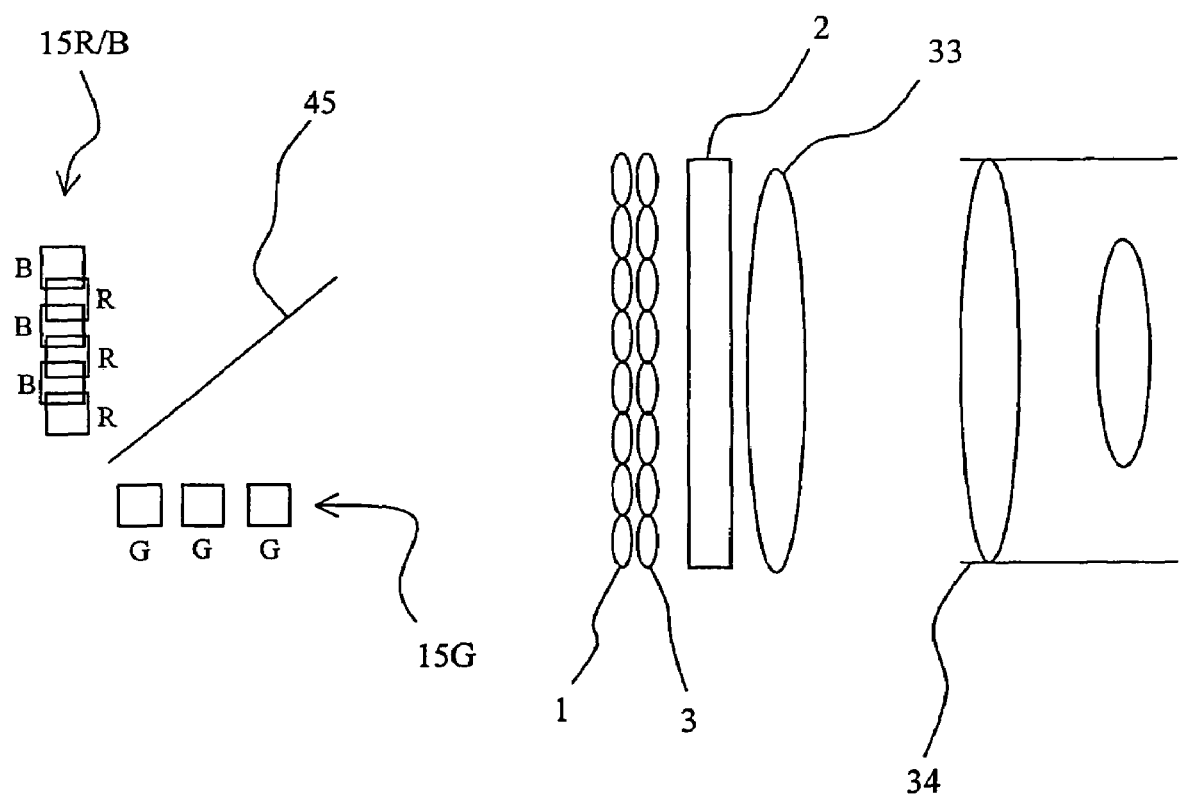
FIG. 22 illustrates diagrammatically an illumination system using two arrays of light sources in a time-sequential colour projector.

FIG. 22 illustrates a projector light source arrangement similar to that shown in FIG. 5, and also similar in certain respects to the internal illumination unit arrangement shown for example in FIG. 9 which uses a dichroic prism or dichroic mirrors. In the FIG. 5 arrangement, a single array 15 of light sources cooperates with the lens array 1 to focus light onto the pixels of the light valve 2. On the other hand, the FIG. 22 arrangement comprises a first array 15R/B of light sources arranged in a first plane comprises and a second array 15G of light sources arranged in a second plane.

Each light source in the first array 15R/B contains only red and blue light emitters, for example a pair of red and blue LEDs, whereas each light source in the second light source array 15G comprises only a green light emitters, for example a green LED. The light sources in the first array 15R/B are controlled to give an appropriate pattern of red and green illumination in each time frame corresponding to the light valve data at the light valve 2 as in the FIG. 5 arrangement.

The FIG. 22 arrangement comprises lens arrays 1 and 3, performing an equivalent function to the same-numbered parts illustrated in FIGS. 4 and 14, a light valve 2, a light-gathering lens 33 and a projection lens arrangement 34. In the FIG. 22 arrangement, a reflector 45 is arranged to reflect green light from the green light emitters 15G towards the lens array 1 and light valve 2, and to pass light from the red and blue emitters 15R/B through to the lens array 1 and light valve 2. Other arrangements of the red, green and blue light emitters, with appropriate use and positioning of mirrors, prisms or the like, would be readily apparent to the skilled person.

What is claimed is:

1. A time-sequential colour projector comprising a first pixellated light valve, first and second light sources, and an optical system arranged to direct light from the light sources on first and second sets of pixels, respectively, of the first light valve, the first light source being arranged to emit first and second colours in first and second sequences of time frames, respectively, and the second light source being arranged to emit a third colour different from the first colour and a fourth colour different from the second colour in the first and second time frame sequences, respectively,
    wherein each of the first colour, the second colour, the third colour and the fourth colour is one of the colours from a group consisting of three different colours.

2. A projector as claimed in claim 1, in which each of the first and second light sources comprise a multiple colour light emitter.

3. A projector as claimed in claim 1, in which each of the first and second light sources comprise first light emitters for emitting light of the first or third colour and second light emitters for emitting light of the second or fourth colour.

4. A projector as claimed in claim 1, in which the first and second light sources are arranged to direct light in first and second angular ranges, respectively, towards the first light valve.

5. A projector as claimed in claim 1, in which the first and second light sources comprise a two-dimensional array of light emitters.

6. A projector as claimed in claim 5, in which the light emitters are arranged as rows cooperating with a cylindrically converging lens array to direct light onto the pixels of the light valve.

7. A projector as claimed in claim 1, in which the first colour is the same as the fourth colour and the second colour is the same as the third colour.

8. A projector as claimed in claim 7, in which the first and fourth colours are red and the second and third colours are green.

9. A projector as claimed in claim 7, comprising a third light source arranged to emit a fifth colour, different from the first to fourth colours, and direct this towards the first light valve wherein the fifth colour is one of the colours from the grour consisting of three different colours.

10. A projector as claimed in claim 9, wherein the fifth colour is blue.

11. A projector as claimed in claim 9, in which the first and second light sources comprise a two-dimensional array of light emitters, and wherein the third light source comprises a two-dimensional array of light emitters arranged in a different plane to the two-dimensional light emitter array of the first and second light sources.

12. A projector as claimed in claim 8, comprising a second pixellated light valve, a third light source for directing blue light towards the second light valve, and an optical combiner for combining light from the first and second light valves into a common projection light path.

13. A projector as claimed in claim 1, comprising a third light source arranged to direct light on a third set of pixels of the first light valve, each of the light sources being arranged to emit first, second and third colours in a repeating sequence such that the light sources emit different colours in time frames of a repeating set of three time frames.

14. A projector as claimed in claim 13, in which the first, second and third colours are red, green and blue, respectively.

15. A projector as claimed in claim 13, in which the first and second light sources are arranged to direct light in first and second angular ranges, respectively, towards the first light valve, and in which the third light source is arranged to direct light in a third angular range towards the first light valve.

16. A projector as claimed in claim 1, in which the optical system comprises a first microlens array.

17. A projector as claimed in claim 16, in which the first microlens array comprises a hexagonal array of spherically converging lenses.

18. A projector as claimed in claim 16, in which the first microlens array comprises an array of cylindrically converging lenses.

19. A projector as claimed in claim 16, in which the optical system comprises a second microlens array optically in series with the first array.

20. A projector as claimed in claim 16, in which the optical system comprises a field lens optically in series with the first array.

21. A projector as claimed in claim 1, in which each light source is an electronic light source.

22. A projector as claimed in claim 1, in which each light source is arranged to emit a single colour in each time frame sequence.

23. A projector as claimed in claim 22, in which at least one light source comprises a broadband emitter cooperating with a switchable filter.

24. A projector as claimed in claim 1, in which at least one light source comprises at least one electronic light emitter.

25. A projector as claimed in claim 24, in which at least one light emitter comprises a solid state light emitter.

26. A projector as claimed in claim 25, in which at least one light emitter comprises a semiconductor light emitter.

27. A projector as claimed in claim 26, in which at least one light emitter comprises one of a light emitting diode, a resonant-cavity light emitting diode, a superluminescent diode and a laser diode.

28. A projector as claimed in claim 24, in which at least one light emitter is adapted to emit light in a narrow emission band.

29. A projector as claimed in claim 1, in which at least one light source is electronically switchable.

30. A projector as claimed in claim 1, in which at least one light source comprises a collimator and first and second lens arrays, each of the lenses of the first lens array having substantially the same aspect ratio as the first light valve and focusing light at the second lens array, each lens of the second lens array forming an image of a respective lens of the first lens array which substantially covers the first light valve.

31. A projector as claimed in claim 1, in which the or each light valve comprises a liquid crystal device.

* * * * *